US012587983B2

(12) United States Patent
Tsuda

(10) Patent No.: US 12,587,983 B2
(45) Date of Patent: Mar. 24, 2026

(54) BASE STATION DEVICE, TERMINAL DEVICE, AND COMMUNICATION METHOD

(71) Applicant: SONY GROUP CORPORATION, Tokyo (JP)

(72) Inventor: Shinichiro Tsuda, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 378 days.

(21) Appl. No.: 18/003,617

(22) PCT Filed: Jun. 30, 2021

(86) PCT No.: PCT/JP2021/024721
§ 371 (c)(1),
(2) Date: Dec. 28, 2022

(87) PCT Pub. No.: WO2022/009745
PCT Pub. Date: Jan. 13, 2022

(65) Prior Publication Data
US 2023/0239818 A1 Jul. 27, 2023

(30) Foreign Application Priority Data
Jul. 10, 2020 (JP) ................................. 2020-119484

(51) Int. Cl.
*H04W 56/00* (2009.01)
*H04W 28/18* (2009.01)

(52) U.S. Cl.
CPC ....... *H04W 56/0015* (2013.01); *H04W 28/18* (2013.01)

(58) Field of Classification Search
CPC . H04W 56/0015; H04W 28/18; H04W 72/11; H04W 76/28; H04W 52/0216;
(Continued)

(56) References Cited

U.S. PATENT DOCUMENTS

2015/0100620 A1* 4/2015 Jin .......................... H04L 65/80
709/201
2020/0383004 A1* 12/2020 Hande ................... H04W 24/08
(Continued)

FOREIGN PATENT DOCUMENTS

| JP | 2015513829 A | 5/2015 |
| JP | 2019-531632 A | 10/2019 |
| WO | 2013/038525 A1 | 3/2013 |

OTHER PUBLICATIONS

U.S. Appl. No. 62/977,992, filed Feb. 18, 2020 (Year: 2020).*
(Continued)

*Primary Examiner* — Sun Jong Kim
(74) *Attorney, Agent, or Firm* — CHIP LAW GROUP

(57) ABSTRACT

There is provided a communication device that includes circuitry for supporting extended reality (XR) services. The communication device obtains information related to XR traffic periods from a core network and uses this to adjust power-saving settings. When a delay between the reception time and the display time of video data at a terminal device exceeds a certain threshold, the communication device modifies scheduling parameters for data transmission. The communication device adjusts the configured grant configuration and optimizes the terminal's reception timing by configuring discontinuous reception (DRX) settings based on control channel monitoring requirements and transmission periodicity.

6 Claims, 22 Drawing Sheets

(58) Field of Classification Search
CPC ............. H04W 72/23; H04W 52/0229; H04W
52/0245; H04W 72/1273; H04W 88/085;
H04W 52/0235
See application file for complete search history.

(56) References Cited

U.S. PATENT DOCUMENTS

| | | | | |
|---|---|---|---|---|
| 2020/0389915 | A1* | 12/2020 | Sundararajan | .... H04W 72/1268 |
| 2021/0258831 | A1* | 8/2021 | Belling | .............. H04L 47/2441 |
| 2021/0321480 | A1* | 10/2021 | Kwon | .................. H04W 76/28 |

OTHER PUBLICATIONS

International Search Report and Written Opinion of PCT Application No. PCT/JP2021/024721, issued on Sep. 21, 2021, 08 pages of ISRWO.
"Technical Specification Group Services and System Aspects; Study on Network Controlled Interactive Services", 3rd Generation Partnership Project, 3GPP TR 22.842, Version 17.1.0, Release 17, Sep. 2019, 29 pages.
"Technical Specification Group Services and System Aspects; Service requirements for the 5G system", 3rd Generation Partnership Project, 3GPP TS 22.261, Version 17.0.1, Release 17, Oct. 2019, 83 pages.

* cited by examiner

100

110

TERMINAL DEVICE

BASE STATION
DEVICE
130

150

INFORMATION
PROCESSING DEVICE

150

INFORMATION PROCESSING DEVICE

151

153

152

COMMUNICA-
TION UNIT

CONTROL UNIT

1533

RADIO RESOURCE
ALLOCATION
REQUESTING UNIT

1532

VIDEO DATA
GENERATING UNIT

1531

INERTIAL MEASURE-
MENT INFORMATION
ACQUIRING UNIT

STORAGE
UNIT

| 809<br>LOW<br>RESOLUTION | 802<br>INTERMEDIATE<br>RESOLUTION | 806<br>LOW<br>RESOLUTION |
|---|---|---|
| 805<br>INTERMEDIATE<br>RESOLUTION | 801<br>HIGH<br>RESOLUTION | 803<br>INTERMEDIATE<br>RESOLUTION |
| 808<br>LOW<br>RESOLUTION | 804<br>INTERMEDIATE<br>RESOLUTION | 807<br>LOW<br>RESOLUTION |

| 809<br>LOW<br>PRIORITY | 802<br>INTERMEDIATE<br>PRIORITY | 806<br>LOW<br>PRIORITY |
|---|---|---|
| 805<br>INTERMEDIATE<br>PRIORITY | 801<br>HIGH<br>PRIORITY | 803<br>INTERMEDIATE<br>PRIORITY |
| 808<br>LOW<br>PRIORITY | 804<br>INTERMEDIATE<br>PRIORITY | 807<br>LOW<br>PRIORITY |

FIG.26

BASE STATION DEVICE, TERMINAL DEVICE, AND COMMUNICATION METHOD

CROSS REFERENCE TO RELATED APPLICATIONS

This application is a U.S. National Phase of International Patent Application No. PCT/JP2021/024721 filed on Jun. 30, 2021, which claims priority benefit of Japanese Patent Application No. JP 2020-119484 filed in the Japan Patent Office on Jul. 10, 2020. Each of the above-referenced applications is hereby incorporated herein by reference in its entirety.

FIELD

The present disclosure relates to a base station device, a terminal device, and a communication method.

BACKGROUND

Wireless access schemes and wireless networks for cellular mobile communication (hereinafter also referred to as "Long Term Evolution (LTE)", "LTE-Advanced (LTE-A)", "LTE-Advanced Pro (LTE-A Pro)", "New Radio (NR)", "New Radio Access Technology (NRAT)", "Evolved Universal Terrestrial Radio Access (EUTRA)", or "Further EUTRA (FEUTRA)") are under examination in the 3rd Generation Partnership Project (3GPP). Note that, in the following description, LTE includes LTE-A, LTE-A Pro, and EUTRA, and NR includes NRAT and FEUTRA. In LTE, a base station device (base station or communication device) is also referred to as an evolved NodeB (eNodeB), and in NR, a base station device (base station or communication device) is also referred to as a gNodeB. In LTE and NR, a terminal device (mobile station, mobile station device, terminal, or communication device) is also referred to as user equipment (UE). LTE and NR are cellular communication systems in which a plurality of areas covered by base station devices is arranged in cell shapes. Note that a single base station device may manage a plurality of cells.

NR has features of ultra-high speed, low delay, high reliability, and multiple simultaneous connections. As one of use cases of NR utilizing such features, for example, utilization in services using augmented reality (AR) and virtual reality (VR) is studied. For example, in the case of AR technology, it is possible to superimpose virtual content of various modes such as text, an icon, or animation on a real object captured in an image of a real space and to present it to a user. Non Patent Literature 1 and Non Patent Literature 2 disclose use cases and (latent) required conditions of services (e.g. AR or VR games) using augmented reality (AR) or virtual reality (VR).

CITATION LIST

Non Patent Literatures

Non Patent Literature 1: 3GPP TR 22.842, V17.1.0 (2019-09) 3rd Generation Partnership Project; Technical Specification Group Services and System Aspects; Study on Network Controlled Interactive Services (Release 17)

Non Patent Literature 2: 3GPP TS 22.261 v17.0.1 (2019-10) 3rd Generation Partnership Project; Technical Specification Group Services and System Aspects; Service requirements for next generation new services and markets (Release 17)

SUMMARY

Technical Problem

NR is expected to transmit 4K or 8K videos due to features of ultra-high speed, low delay, high reliability, and multiple simultaneous connections. In addition, wearable devices are expected to be widely used as post-smartphones. Some use cases of wearable devices require consideration of not only the aspect of ultra-high speed but also the aspects of low delay and high reliability. For example, in a case where VR content is displayed on a head mounted display (HMD) via radio, it is important to suppress motion-to-photon latency within a certain value in order to prevent VR sickness. In this manner, it is required to distribute video content for which real-time property is required so that the video content can be stably displayed.

Therefore, the present disclosure proposes technology that contributes to implementation of video content distribution that can be stably displayed.

Note that the above disadvantage or object is merely one of a plurality of disadvantages or objects that can be solved or achieved by a plurality of embodiments disclosed herein.

Solution to Problem

According to the present disclosure, a base station device is provided. The base station device includes a radio communication unit and a control unit. The radio communication unit transmits video data to a terminal device in a predetermined period. The control unit changes settings regarding reception timing in a case where a difference between periodic reception timing at which the terminal device receives the video data and display timing of the video data displayed on the terminal device at a predetermined frame rate satisfies a predetermined condition.

BRIEF DESCRIPTION OF DRAWINGS

FIG. 5 is a diagram illustrating an example of the 5G architecture.

FIG. 12 is a diagram for explaining an example of distribution of video data by the content distribution system.

FIG. 13 is a diagram for describing SPS reconfiguration by the base station device according to the embodiment of the disclosure.

FIG. 19 is a diagram for describing CG reconfiguration by the base station device according to the embodiment of the disclosure.

FIG. 20 is a diagram for describing an example of display processing by the terminal device according to the embodiment of the disclosure.

FIG. 21 is a diagram for describing another example of the display processing by the terminal device according to the embodiment of the disclosure.

FIG. 26 is a concept diagram of a rendering server regarding rendering and an AR/VR client.

DESCRIPTION OF EMBODIMENTS

Hereinafter, embodiments of the present disclosure will be described in detail by referring to the accompanying drawings. Note that, in the present specification and the drawings, components having substantially the same functional configuration are denoted by the same symbols, and redundant description is omitted.

In addition, in the present specification and the drawings, similar components of embodiments may be distinguished by attaching different alphabets after the same symbol. Note that, in a case where it is not necessary to particularly distinguish each of similar components, only the same symbol is assigned.

One or more embodiments (including examples and modifications) described below can be each implemented independently. On the other hand, at least a part of the plurality of embodiments described below may be combined with at least a part of another embodiment as appropriate. The plurality of embodiments may include novel features different from each other. Therefore, the plurality of embodiments can contribute to solving different objects or disadvantages and achieve different effects.

Note that the description will be given in the following order.

1. Configuration Example of Content Distribution System
1.1. Overall Configuration Example of Content Distribution System
1.2. Configuration Example of Information Processing Device
1.3. Configuration Example of Base Station Device
1.4. Configuration Example of Terminal Device
1.5. Configuration Example of Network Architecture
2. Example of Information Processing of Content Distribution System
2.1. Example of Content Distribution Processing
2.2. Example of Rendering Processing
2.3. Example of Communication Processing
3. Technical Problems
4. Technical Features
4.1. Reconfiguring SPS
4.2. Configuring Plurality of SPSs
4.3. Reconfiguring CG
4.4. Modifying Timewarp
4.5. Setting Priorities
5. Other Embodiments
6. Application Examples
7. Conclusion

1. CONFIGURATION EXAMPLE OF CONTENT DISTRIBUTION System

<1.1. Overall Configuration Example of Content Distribution System>

Figure 1:
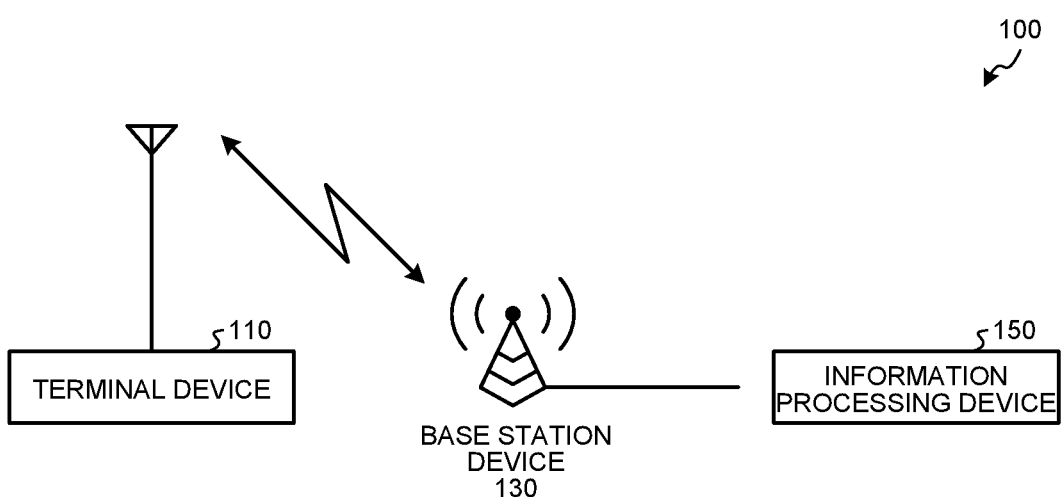
FIG. 1 is a diagram illustrating a configuration example of a content distribution system according to an embodiment of the present disclosure.

FIG. 1 is a diagram illustrating a configuration example of a content distribution system 100 according to an embodiment of the present disclosure. The content distribution system 100 is a system that distributes video content to a terminal device 110 via a radio access network. Here, the radio access networks may be an evolved universal terrestrial radio access network (EUTRAN) or a next generation radio access network (NG-RAN).

The content distribution system 100 includes the terminal device 110, a base station device 130, and an information processing device 150. In the content distribution system 100, video content is distributed from the information processing device 150 to the terminal device 110 via the base station device 130.

The terminal device 110 and the base station device 130 are connected via the radio access network. The base station device 130 and the information processing device 150 can be connected via a wireless or wired access network.

Note that the devices in the drawing may be considered as devices in a logical sense. That is, some of the devices in the drawing may be implemented by a virtual machine (VM), a container, a docker, or the like, and they may be implemented on physically the same hardware.

Note that an LTE base station may be referred to as an evolved node B (eNodeB) or an eNB. Meanwhile, an NR base station may be referred to as a next generation RAN node (NGRAN node), a gNodeB, or a gNB. Moreover, in LTE and NR, a terminal device (also referred to as a mobile station, a mobile station device, or a terminal) may also be referred to as a user equipment (UE). Note that a terminal device is a type of communication devices and is also referred to as a mobile station, a mobile station device, or a terminal.

In the present embodiment, the concept of the communication device includes not only a portable mobile device (terminal device) such as a mobile terminal but also a device installed in a structure or a traveling body. A structure or a traveling body itself may be regarded as a communication device. Meanwhile, the concept of the communication device includes not only terminal devices but also base station devices. A communication device is a type of processing devices and information processing devices. Furthermore, a communication device can be rephrased as a transmission device or a reception device.

[Information Processing Device]

The information processing device 150 is a content management device that manages video content in the terminal device 110. The information processing device 150 is, for example, a personal computer, a workstation, or a game device. Furthermore, the information processing device 150 may be a device collectively referred to as a cloud server or an edge server.

[Base Station Device]

The base station device 130 is a wireless communication device that performs wireless communication with the terminal device 110. The base station device 130 is a type of communication devices. In addition, the base station device 130 is a type of information processing devices.

The base station device 130 may include a set of a plurality of physical or logical devices. For example, in the embodiment of the disclosure, the base station device 130 may be distinguished into a plurality of devices of a baseband unit (BBU) and a radio unit (RU) and may be interpreted as aggregate of the plurality of devices. Furthermore or alternatively, in the embodiment of the disclosure, the base station device 130 may be either one or both of a BBU and an RU. The BBU and the RU may be connected by a predetermined interface (for example, eCPRI). Furthermore or alternatively, the RU may be referred to as a remote radio unit (RRU) or a Radio DoT (RD). Furthermore or alternatively, the RU may correspond to a gNB-DU to be described later. Furthermore or alternatively, the BBU may correspond to a gNB-CU to be described later. Furthermore or alternatively, the RU may be a device integrally formed with an antenna. An antenna (for example, an antenna integrally formed with an RU) included in the base station device 130 may adopt Advanced Antenna System and support MIMO (for example, FD-MIMO) or beamforming. In the advanced antenna systems, an antenna (for example, an antenna integrally formed with an RU) included in the base station device 130 may include, for example, 64 transmission antenna ports and 64 reception antenna ports. In addition, the antenna mounted on the RU may be an antenna panel including one or more antenna elements, and the RU may be mounted with one or more antenna panels. For example, the RU may be mounted with two types of antenna panels of an antenna panel of a horizontally polarized wave and an antenna panel of a vertically polarized wave or two types of antenna panels of an antenna panel of a clockwise circularly polarized wave and an antenna panel of a counterclockwise circularly polarized wave. In addition, the RU may form and control an independent beam for each antenna panel.

Furthermore, a plurality of the base station devices 130 may be connected to each other. One or more base station devices 130 may be included in a radio access network (RAN). That is, the base station device 130 may be simply referred to as a RAN, a RAN node, an access network (AN), or an AN node. A RAN in LTE is referred to as an enhanced universal terrestrial RAN (EUTRAN). A RAN in NR is referred to as an NGRAN. A RAN in W-CDMA (UMTS) is referred to as a UTRAN. The base station device 130 in LTE is referred to as an evolved node B (eNodeB) or an eNB. That is, the EUTRAN includes one or more eNodeBs (eNBs). Furthermore, the base station device 130 of NR is referred to as a gNodeB or a gNB. That is, the NGRAN includes one or more gNBs. Furthermore, the EUTRAN may include a gNB (en-gNB) connected to a core network (EPC) in an LTE communication system (EPS). Similarly, the NGRAN may include an ng-eNB connected to a core network 5GC in a 5G communications system (5GS). Furthermore or alternatively, in a case where the base station device 130 is an eNB, a gNB, or the like, it may be referred to as 3GPP Access. Furthermore or alternatively, in a case where the base station device 130 is a wireless access point, it may be referred to as Non-3GPP access. Furthermore or alternatively, the base station device 130 may be an optical extension device called a remote radio head (RRH). Furthermore or alternatively, in a case where the base station device 130 is a gNB, the base station device 130 may be referred to as a combination of the above-described gNB central unit (CU) and gNB distributed unit (DU) or any one of them. The gNB central unit (CU) hosts a plurality of upper layers (for example, RRC, SDAP, or PDCP) in the access stratum for communication with UEs. Meanwhile, the gNB-DU hosts a plurality of lower layers (for example, RLC, MAC, PHY) in the access stratum. That is, among messages and information described later, RRC signalling (for example, various SIBs including MIB and SIB1, an RRCSetup message, and an RRCReconfiguration message) may be generated by the gNB CU, whereas DCI or various physical channels (for example, PDCCH or PBCH) described later may be generated by the gNB-DU. Alternatively, in the RRC signalling, for example, some configurations such as IE: cellGroupConfig may be generated by the gNB-DU, and the remaining configurations may be generated by the gNB-CU. These configurations may be transmitted and received by an F1 interface to be described later. The base station device 130 may be configured to enable communication with another base station device 130. For example, in a case where a plurality of base station devices 130 is eNBs or a combination of eNBs and en-gNBs, the base station devices 130 may be connected by an X2 interface. Furthermore or alternatively, in a case where a plurality of base station devices 130 is gNBs or a combination of gn-eNBs and gNBs, the devices may be connected by an Xn interface. Furthermore or alternatively, in a case where a plurality of base station devices 130 is a combination of gNB central units (CUs) and gNB distributed units (DUs), the devices may be connected by the above-described F1 interface. Message and information (information included in RRC signalling or DCI) to be described later may be communicated between a plurality of base station devices 130 (e.g. via X2, Xn, or F1 interface).

Furthermore, as described above, the base station device 130 may be configured to manage a plurality of cells. A cell provided by the base station device 130 is referred to as a serving cell. A serving cell includes a primary cell (PCell) and a secondary cell (SCell). In a case where dual connectivity (for example, EUTRA-EUTRA dual connectivity, EUTRA-NR dual connectivity (ENDC), EUTRA-NR dual connectivity with 5GC, NR-EUTRA dual connectivity (NEDC), and NR-NR dual connectivity) is provided to the UE (for example, the terminal device 110), a PCell and zero or one or more SCell(s) provided by a master node (MN) are referred to as a master cell group. Furthermore, a serving cell may include a PSCell (primary secondary cell or primary SCG cell). That is, in a case where dual connectivity is provided to the UE, a PSCell and zero or one or more SCell(s) provided by a secondary node (SN) are referred to as a secondary cell group (SCG). Unless specially configured (for example, PUCCH on the SCell(s)), the transmission in the physical uplink control channel (PUCCH) is performed in the PCell and the PSCell but not in the SCells. In addition, a radio link failure is detected in the PCell and the PSCell but not in the SCells (detection not necessary). As described above, since the PCell and the PSCell have a special role among the serving cell(s), they are also referred to as special cells (SpCells). One downlink component carrier and one uplink component carrier may be associated with one cell. In addition, a system bandwidth corresponding to one cell may be divided into a plurality of bandwidth parts. In this case, one or more Bandwidth Parts (BWP) may be configured for the UE, and one bandwidth part may be used for the UE as an active BWP. Furthermore, radio resources (for example, a frequency band, numerology (subcarrier spacing), and a slot format (slot configuration)) that the terminal device 110 can use may be different for each cell, each component carrier, or each BWP.

[Terminal Device]

The terminal device 110 is a radio communication device that performs wireless communication with the base station device 130. The terminal device 110 is, for example, a mobile phone, a smart device (smartphone or tablet), a personal digital assistant (PDA), or a personal computer. The terminal device 110 may be a head mounted display having a function of wirelessly transmitting and receiving data, VR goggles, or the like.

Furthermore, the terminal device 110 may be capable of performing sidelink communication with another terminal device 110. The terminal device 110 may be able to use automatic retransmission technology such as the hybrid automatic repeat request (HARQ) when performing sidelink communication. The terminal device 110 may be capable of non-orthogonal multiple access (NOMA) communication with the base station device 130. Note that the terminal device 110 may also be capable of performing NOMA communication in communication (sidelink) with another terminal device 110. Furthermore, the terminal device 110 may be capable of performing low power wide area (LPWA) communication with other communication devices (for example, the base station device 130 and another terminal device 110). In addition, the wireless communication used by the terminal device 110 may be wireless communication using millimeter waves. Note that the wireless communication (Including sidelink communication) used by the terminal device 110 may be wireless communication using radio waves or wireless communication (optical wireless transmission) using infrared rays or visible light.

The terminal device 110 may be simultaneously connected to a plurality of base station devices or a plurality of cells to perform communication. For example, in a case where one base station device can provide a plurality of cells, the terminal device 110 can perform carrier aggregation by using a certain cell as a pCell and using other cells as sCells. Furthermore, in a case where a plurality of base station devices 130 can each provide one or a plurality of cells, the terminal device 110 can implement dual connectivity (DC) by using one or a plurality of cells managed by one base station device (MN (for example, MeNB or MgNB)) as a pCell or a pCell and (a) sCell(s) and using one or a plurality of cells managed by another base station device (SN (for example, SeNB or SgNB)) as a pCell (PSCell) or a pCell (PSCell) and (a) sCell(s). DC may also be referred to as multi connectivity (MC).

Note that, in a case where a communication area is supported via cells of different base station devices 130 (a plurality of cells having different cell identifiers or the same cell identifier), it is possible to bundle the plurality of cells to enable communication between the base station devices 130 and the terminal device 110 by carrier aggregation (CA) technology, dual connectivity (DC) technology, or multi-connectivity (MC) technology. Alternatively, the terminal device 110 and the plurality of base station devices 130 can communicate with each other by coordinated transmission and reception (coordinated multi-point transmission and reception (CoMP)) technology via cells of different base station devices 130.

Hereinafter, the configuration of each device included in the content distribution system 100 will be specifically described. Note that the configurations of the respective devices described below are merely examples. The configuration of each of the devices may be different from the following configuration.

<1.2. Configuration Example of Information Processing Device>

Figure 2:
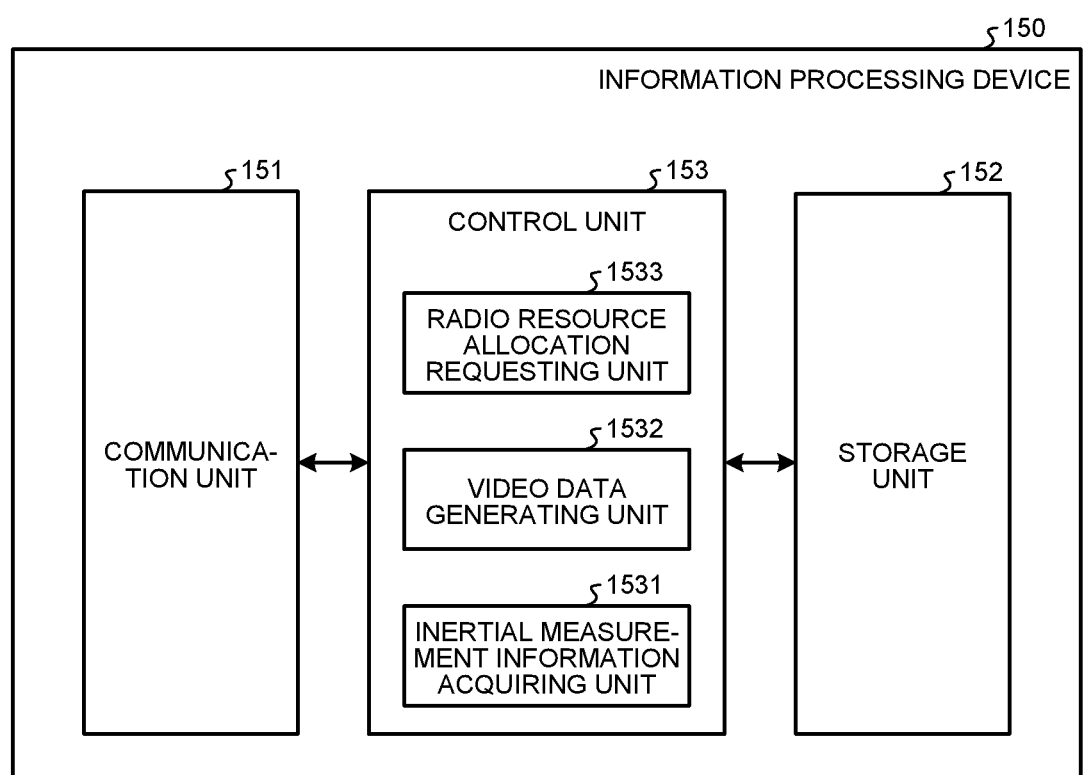
FIG. 2 is a diagram illustrating a configuration example of an information processing device according to the embodiment of the disclosure.

FIG. 2 is a diagram illustrating a configuration example of the information processing device 150 according to the embodiment of the disclosure. The information processing device 150 is, for example, a device that manages or generates video content. The information processing device 150 includes a communication unit 151, a storage unit 152, and a control unit 153. Note that the configuration illustrated in FIG. 2 is a functional configuration, and the hardware configuration may be different from the functional configuration. Furthermore, the functions of the information processing device 150 may be implemented in a distributed manner in a plurality of physically separated configurations. For example, the information processing device 150 may include a plurality of server devices.

The communication unit 151 is a communication interface for communicating with other devices. The communication unit 151 may be a network interface or a device connection interface. For example, the communication unit 151 may be a local area network (LAN) interface such as a network interface card (NIC) or may be a universal serial bus (USB) interface including a USB host controller, a USB port, and others. Moreover, the communication unit 151 may be a wired interface or a wireless interface. The communication unit 151 functions as a communication means of the information processing device 150. The communication unit 151 communicates with the base station device 130 under the control by the control unit 153.

The storage unit 152 is a data readable and writable storage device such as a dynamic random access memory (DRAM), a static random access memory (SRAM), a flash memory, or a hard disk. The storage unit 152 functions as a storage means of the information processing device 150. The storage unit 152 stores, for example, video content.

The control unit 153 is a controller that controls each unit of the information processing device 150. The control unit 153 is implemented by, for example, a processor such as a central processing unit (CPU), a micro processing unit (MPU), or a graphics processing unit (GPU). For example, the control unit 153 is implemented by a processor executing various programs stored in a storage device inside the information processing device 150 using a random access memory (RAM) or the like as a work area. Note that the control unit 153 may be implemented by an integrated circuit such as an application specific integrated circuit (ASIC) or a field programmable gate array (FPGA). Any of the CPU, the MPU, the GPU, the ASIC, and the FPGA can be regarded as a controller.

The control unit 153 includes an inertial measurement information acquiring unit 1531, a video data generating unit 1532, and a radio resource allocation requesting unit 1533. Each of the blocks included in the control unit 153 (from the inertial measurement information acquiring unit 1531 to the radio resource allocation requesting unit 1533) is a functional block each indicating a function of the control unit 153. These functional blocks may be software blocks or hardware blocks. For example, each of the functional blocks described above may be one software module implemented by software (including microprograms) or may be one circuit block on a semiconductor chip (die). It goes without saying that each of the functional blocks may be one processor or one integrated circuit. The functional blocks may be configured in any manner. Note that the control unit 153 may include a functional unit different from the above-described functional block.

The inertial measurement information acquiring unit 1531 acquires inertial measurement information from the terminal device 110 via the base station device 130. The inertial measurement information is information regarding inertia, and is, for example, information of a detection result (for example, the orientation of a line of sight of the user) detected by a sensor mounted on the terminal device 110 such as acceleration information or angular velocity information of the terminal device 110. The inertial measurement information is, for example, information indicating a state (for example, the orientation of the head or the line of sight) of the user who uses the terminal device 110. As a more specific example, the information regarding the inertia may be a change amount of a component in each of a yaw direction, a pitch direction, and a roll direction as the movement of the head of the user. These components may be detected by a sensor (acceleration sensor or angular velocity sensor (gyro sensor)) mounted on the terminal device 110.

The video data generating unit 1532 determines the area of a video on the basis of the acquired inertial measurement information and generates video data to be distributed to the terminal device 110. On the basis of the inertial measurement information, the video data generating unit 1532 determines a video area, in which a video in a direction in which the user is viewing is distributed, and generates video data.

The radio resource allocation requesting unit 1533 requests the base station device 130 to allocate radio resources to be used for transmission of video data.

Note that the control unit 153 may acquire information regarding an operation input by the user from the terminal device 110 via the base station device 130, determine the area of the video on the basis of the information regarding the operation, and generate the video data to be distributed to the terminal device 110. Note that the operation input by the user is, for example, an operation in a game, an operation for remotely controlling or operating a device, or others.

<1.3. Configuration Example of Base Station Device>

Figure 3:
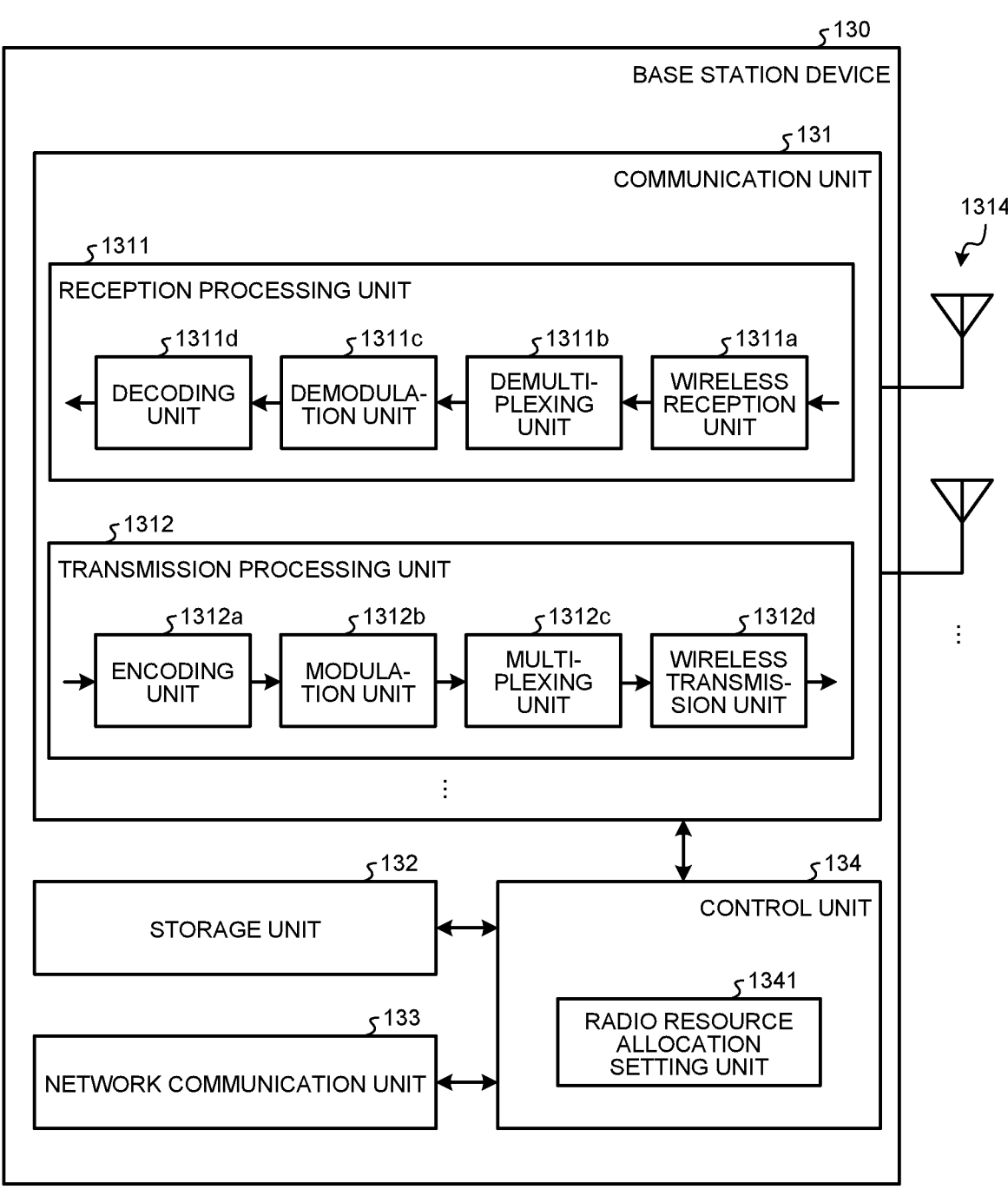
FIG. 3 is a diagram illustrating a configuration example of a base station device according to the embodiment of the disclosure.

Next, the configuration of the base station device 130 will be described. FIG. 3 is a diagram illustrating a configuration example of the base station device 130 according to the embodiment of the disclosure.

The base station device 130 includes a communication unit 131, a storage unit 132, a network communication unit 133, and a control unit 134. Note that the configuration illustrated in FIG. 3 is a functional configuration, and the hardware configuration may be different from the functional configuration. Furthermore, the functions of the base station device 130 may be implemented in a distributed manner in a plurality of physically separated configurations.

The communication unit 131 is a signal processing unit for wirelessly communicating with another wireless communication device (for example, the terminal device 110 or another base station device 130). The communication unit 131 operates under the control by the control unit 134. In a case where the other wireless communication device is the terminal device 110, the communication unit 131 may be a wireless transceiver supporting one or more wireless access schemes. For example, the communication unit 131 supports both NR and LTE. The communication unit 131 may also support W-CDMA or cdma2000 in addition to NR or LTE. Furthermore, the communication unit 131 may support communication using NOMA. In a case where the other wireless communication device is another base station device 130, the communication unit 131 may be an X2 interface, an Xn interface, or an F1 interface.

The communication unit 131 includes a reception processing unit 1311, a transmission processing unit 1312, and an antenna 1314. The communication unit 131 may include a plurality of reception processing units 1311, a plurality of transmission processing units 1312, and a plurality of antennas 1314. Note that, in a case where the communication unit 131 supports a plurality of wireless access schemes, each unit of the communication unit 131 can be configured individually for each wireless access scheme. For example, the reception processing units 1311 and the transmission processing units 1312 may be individually configured by LTE or NR.

A reception processing unit 1311 processes an uplink signal received via an antenna 1314. A reception processing unit 1311 operates as a reception unit that receives a reception signal. A reception processing unit 1311 includes a wireless reception unit 1311a, a demultiplexing unit 1311b, a demodulation unit 1311c, and a decoding unit 1311d.

The wireless reception unit 1311a performs, on an uplink signal, down-conversion, removal of unnecessary frequency components, control of an amplification level, quadrature demodulation, conversion to a digital signal, removal of a guard interval (cyclic prefix), extraction of a frequency domain signal by fast Fourier transform, and the like. The demultiplexing unit 1311b demultiplexes an uplink channel such as a physical uplink shared channel (PUSCH) or a physical uplink control channel (PUCCH) and an uplink reference signal from the signal output from the wireless reception unit 1311a.

The demodulation unit 1311c demodulates the reception signal using a modulation scheme such as binary phase shift keying (BPSK) or quadrature phase shift keying (QPSK) with respect to a modulation symbol of the uplink channel. The modulation scheme used by the demodulation unit 1311c may be 16 quadrature amplitude modulation (QAM), 64QAM, or 256QAM. In this case, signal points on a constellation are not necessarily equidistant. The constellation may be a non-uniform constellation (NUC).

The decoding unit 1311d performs decoding processing on encoded bits of the demodulated uplink channel. The decoded uplink data and uplink control information are output to the control unit 134.

The transmission processing unit 1312 performs a transmission processing of downlink control information and the downlink data. As described above, the transmission processing unit 1312 is an acquisition unit that acquires, for example, a bit sequence of downlink control information, downlink data, or the like from the control unit 134. A transmission processing unit 1312 includes an encoding unit 1312*a*, a modulation unit 1312*b*, a multiplexing unit 1312*c*, and a wireless transmission unit 1312*d*.

The encoding unit 1312*a* encodes the downlink control information and the downlink data input from the control unit 134 using an encoding scheme such as block encoding, convolutional encoding, turbo encoding, or the like. Note that the encoding unit 1312*a* may perform encoding with polar codes or encoding with low density parity check codes (LDPC codes).

The modulation unit 1312*b* modulates the coded bits output from the encoding unit 1312*a* by a predetermined modulation scheme such as BPSK, QPSK, 16QAM, 64QAM, or 256QAM. In this case, signal points on a constellation are not necessarily equidistant. The constellation may be a non-uniform constellation.

The multiplexing unit 1312*c* multiplexes modulation symbols and downlink reference signals of respective channels and arranges them in predetermined resource elements. The wireless transmission unit 1312*d* performs various types of signal processing on the signal from the multiplexing unit 1312*c*. For example, the wireless transmission unit 1312*d* performs processing such as conversion from the time domain to the frequency domain by fast Fourier transform, addition of a guard interval (cyclic prefix), generation of a baseband digital signal, conversion to an analog signal, quadrature modulation, up-conversion, removal of an extra frequency component, and power amplification. The signal generated by the transmission processing unit 1312 is transmitted from an antenna 1314.

The storage unit 132 is a storage device capable of reading and writing data, such as a DRAM, an SRAM, a flash memory, or a hard disk. The storage unit 132 functions as a storage means of the base station device 130.

The network communication unit 133 is a communication interface for communicating with a node positioned at a higher rank on the network (for example, the information processing device 150). For example, the network communication unit 133 may be a LAN interface such as an NIC. Furthermore or alternatively, the network communication unit 133 may be an S1 interface or an NG interface for connection with a core network node. The network communication unit 133 may be a wired interface or a wireless interface. The network communication unit 133 functions as a network communication means of the base station device 130.

The control unit 134 is a controller that controls each of the units of the base station device 130. The control unit 134 is implemented by, for example, a processor (hardware processor) such as a central processing unit (CPU) or a micro processing unit (MPU). For example, the control unit 134 is implemented by a processor executing various programs stored in a storage device inside the base station device 130 using a random access memory (RAM) or the like as a work area. Note that the control unit 134 may be implemented by an integrated circuit such as an application specific integrated circuit (ASIC) or a field programmable gate array (FPGA). Any of the CPU, the MPU, the ASIC, and the FPGA can be regarded as a controller.

The control unit 134 includes a radio resource allocation setting unit 1341. A block (radio resource allocation setting unit 1341) included in the control unit 134 is a functional block indicating a function of the control unit 134. The functional block may be a software block or a hardware block. For example, the functional block described above may be one software module implemented by software (including microprograms) or may be one circuit block on a semiconductor chip (die). It goes without saying that the functional block may be one processor or one integrated circuit. The functional blocks may be configured in any manner. Note that the control unit 134 may include a functional unit different from the above-described functional block.

The radio resource allocation setting unit 1341 executes allocation of radio resources in response to a request from the information processing device 150, for example. The radio resource allocation setting unit 1341 may be, for example, a function called a scheduler.

<1.4. Configuration Example of Terminal Device>

Figure 4:
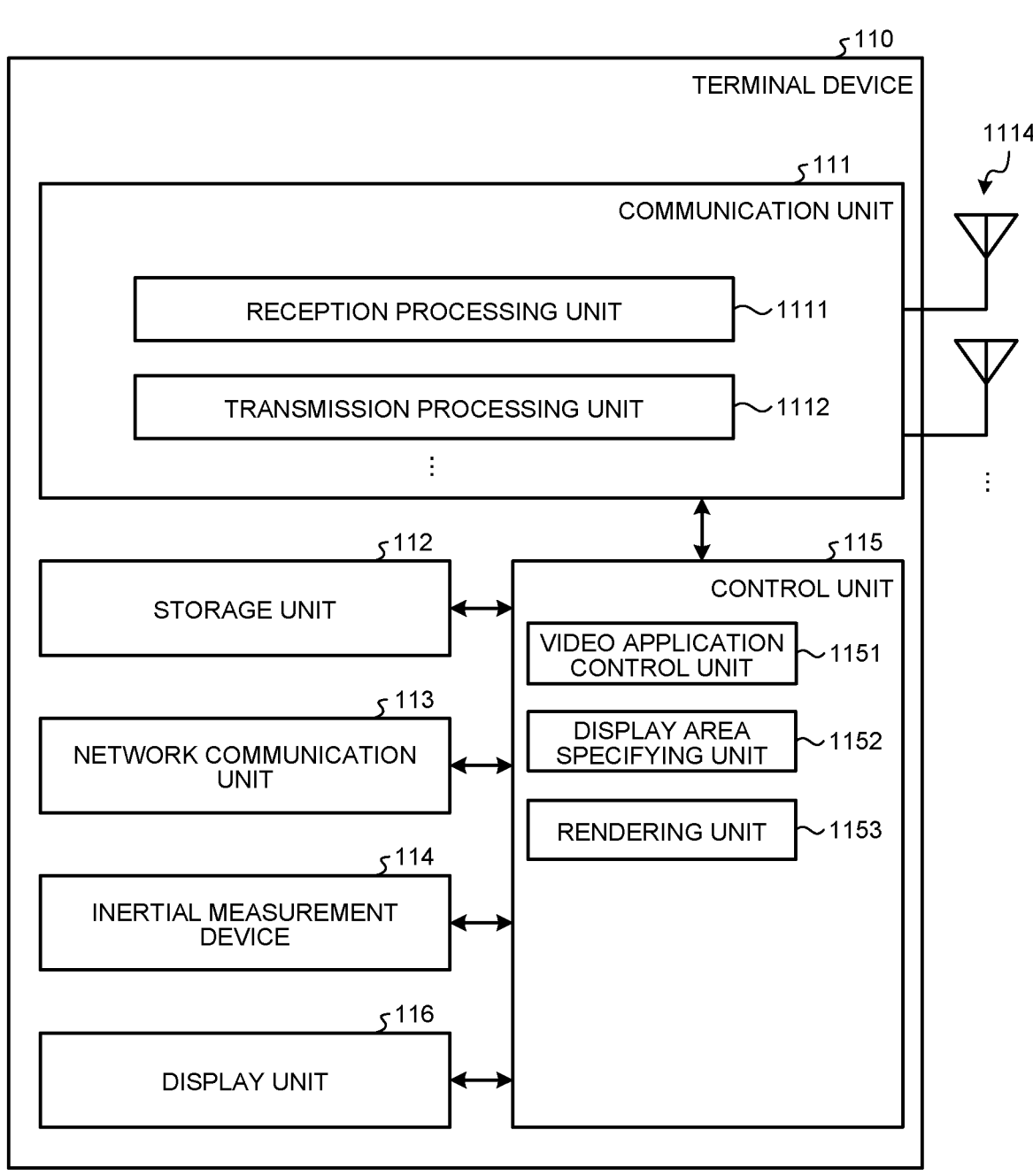
FIG. 4 is a diagram illustrating a configuration example of a terminal device according to the embodiment of the disclosure.

Next, the configuration of the terminal device 110 will be described. FIG. 4 is a diagram illustrating a configuration example of the terminal device 110 according to the embodiment of the disclosure.

The terminal device 110 includes a communication unit 111, a storage unit 112, an inertial measurement device 114, a control unit 115, and a display unit 116. Note that the configuration illustrated in FIG. 4 is a functional configuration, and the hardware configuration may be different from the functional configuration. Furthermore, the functions of the terminal device 110 may be implemented in a distributed manner in a plurality of physically separated configurations.

The communication unit 111 is a signal processing unit for wirelessly communicating with another wireless communication device (for example, the base station device 130 or another terminal device 110). The communication unit 111 operates under the control by the control 115. The communication unit 111 may be a wireless transceiver supporting one or a plurality of wireless access schemes. For example, the communication unit 41 supports both NR and LTE. The communication unit 111 may also support W-CDMA or cdma2000 in addition to NR or LTE. Furthermore, the communication unit 111 may support communication using NOMA.

The communication unit 111 includes a reception processing unit 1111, a transmission processing unit 1112, a network communication unit 113, and an antenna 1114. The communication unit 111 may include a plurality of reception processing units 1111, a plurality of transmission processing units 1112, and a plurality of antennas 1114. The configurations of the communication unit 111, the reception processing units 1111, the transmission processing units 1112, and the antennas 1114 are similar to those of the communication unit 131, the reception processing unit 1311, the transmission processing unit 1312, and the antennas 1314 of the base station device 130.

The storage unit 112 is a storage device capable of reading and writing data, such as a DRAM, an SRAM, a flash memory, or a hard disk. The storage unit 112 functions as a storage means of the terminal device 110.

The network communication unit 113 is a communication interface for communicating with other devices connected via a network. For example, the network communication unit 113 is a LAN interface such as an NIC. The network communication unit 113 may be a wired interface or a wireless interface. The network communication unit 113 functions as a network communication means of the terminal device 110. The network communication unit 113 communicates with other devices under the control by the control unit 115. The other device is, for example, a controller to which a user inputs information related to an operation.

The inertial measurement device 114 is called an inertial measurement unit (IMU) and is a device that detects the angular velocity and the acceleration of three axes. The inertial measurement device 114 includes, for example, an acceleration sensor or a gyro sensor. In order to improve reliability, the inertial measurement device 114 may be mounted with a magnetic field sensor, an atmospheric pressure sensor, a temperature sensor, and the like.

The acceleration information and the angular velocity information detected by the inertial measurement device 114 are transmitted to the information processing device 150 as information regarding inertia (examples of inertial measurement information and user information).

Alternatively, the control unit 115 may calculate the state of the user (for example, the orientation of the head or the line of sight) on the basis of the acceleration information and the angular velocity information detected by the inertial measurement device 114 and transmit the state of the user to the information processing device 150. The state of the user is, for example, information collectively referred to as pose information.

The control unit 115 is a controller that controls each unit of the terminal device 110. The control unit 115 is implemented by, for example, a processor such as a CPU, an MPU, or a GPU. For example, the control unit 115 is implemented by a processor executing various programs stored in the storage device inside the terminal device 110 using a RAM or the like as a work area. Note that the control unit 115 may be implemented by an integrated circuit such as an ASIC or an FPGA. Any of the CPU, the MPU, the GPU, the ASIC, and the FPGA can be regarded as a controller.

The control unit 115 includes a video application control unit 1151, a display area specifying unit 1152, and a rendering unit 1153. Each of the blocks included in the control unit 115 (from the video application control unit 1151 to the rendering unit 1153) is a functional block each indicating a function of the control unit 115. These functional blocks may be software blocks or hardware blocks. For example, each of the functional blocks described above may be one software module implemented by software (including microprograms) or may be one circuit block on a semiconductor chip (die). It goes without saying that each of the functional blocks may be one processor or one integrated circuit. The functional blocks may be configured in any manner. Note that the control unit 45 may include a functional unit different from the above-described functional block.

The video application control unit 1151 is a control unit that controls a video application that performs reproduction of video content and others. The video application control unit 1151 activates a video application in response to an instruction from the user, for example.

The display area specifying unit 1152 estimates the viewpoint of the user using the information regarding the inertia and specifies the display area to be displayed on the display unit 116 from the acquired video data.

The rendering unit 1153 generates an image to be displayed in each frame so as to match the display area specified by the display area specifying unit 1152 on the basis of the video data acquired from the information processing device 150 and edits the video.

The display unit 116 is a display device such as a display and displays various types of information such as an image generated by the rendering unit 1153. The display unit 116 is a display of, for example, a non-transmissive type, a video see-through type, or an optical see-through type. The display unit 116 reproduces the video edited by the rendering unit 1153 by displaying the images at a predetermined frame rate.

<1.5. Configuration Example of Network Architecture>

Figure 5:
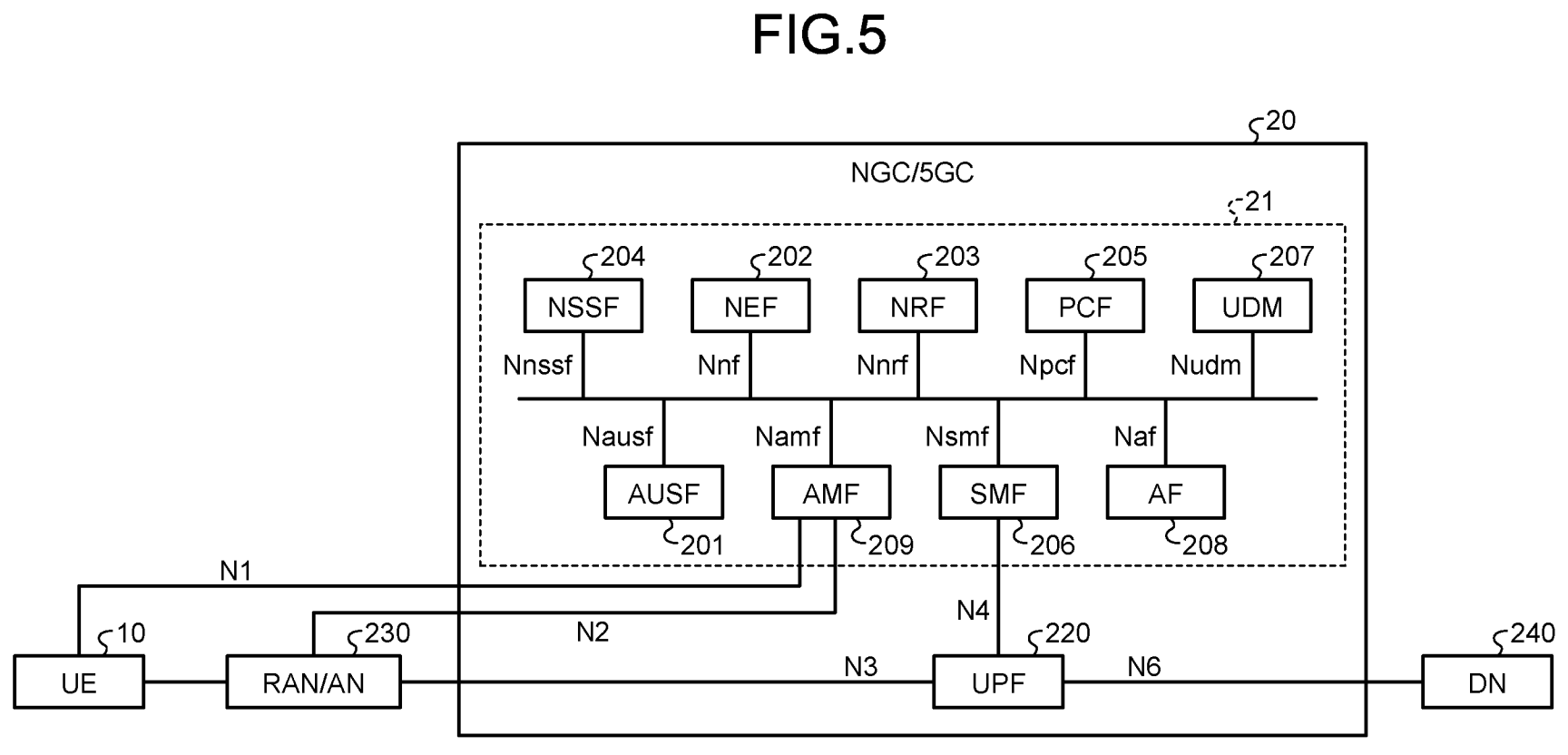

As an example of a communication system applied to the content distribution system 100 according to the embodiment of the disclosure, the architecture of the fifth-generation mobile communication system (5G) will be described. FIG. 5 is a diagram illustrating an example of the 5G architecture. The 5G architecture includes a user equipment (UE) 10, a radio access network (RAN)/access network (AN) 230, a next generation core (NGC)/5G Core (5GC) 20, and a data network (DN) 240.

The 5GC/NGC 20 is also referred to as a 5G core network. The 5GC/NGC 20 is coupled with the UE 10 via the RAN/AN 230.

The RAN 230 is a base station device that provides a wireless interface, and the AN 230 is, for example, an access point or a router that provides a wired interface. The RAN/AN 230 includes a base station device called a gNB or an ng-eNB.

The 5GC/NGC 20 includes control plane functions 21 and a user plane function (UPF) 220.

The control plane functions 21 include an authentication server function (AUSF) 201, a network exposure function (NEF) 202, a network repository function (NRF) 203, a network slice selection function (NSSF) 204, a policy control function (PCF) 205, a session management function (SMF) 206, a unified data management (UDM) 207, an application function (AF) 208, and an access management function (AMF) 209.

The UDM 207 has functions of generating 3GPP AKA authentication information and processing user IDs. The UDM 207 includes a unified data repository (UDR) that holds and manages subscriber information and a front end (FE) unit that processes the subscriber information.

In addition, the AMF 209 has functions such as registration processing, access management, and mobility management of the UE 10.

The SMF 206 has functions such as session management and IP assignment and management of the UE 10. The AUSF 201 has an authentication function. The NSSF 204 has a function related to selection of a network slice. The NEF 202 has a function of providing a capability and an event of a network function to a third party, the AF 208, or an edge computing function.

The NRF 203 has a function of finding a network function or holding a profile of the network function. The PCF 205 has a function of policy control. The AF 208 has a function of interacting with the core network to provide services.

In addition, the user plane function (UPF) 220 has a function of the user plane processing. The DN 240 is, for example, an entity that provides access to services unique to an operator such as a mobile network operator (MNO), an entity that provides the Internet connection, or an entity that provides access to services of a third-party.

Here, Namf is a service-based interface provided by the AMF 209, and Nsmf is a service-based interface provided by the SMF 206. In addition, Nnef is a service-based interface provided by the NEF 202, and Npcf is a service-based interface provided by the PCF 205. Nudm is a service-based interface provided by the UDM 207, and Naf is a service-based interface provided by the AF 208. Nnrf is a service-based interface provided by the NRF 203, and Nnssf is a service-based interface provided by the NSSF 204. Nausf is a service-based interface provided by the AUSF 201. Each of these network functions (NFs) exchanges information with another NF via respective service-based interfaces.

In addition, N1 is a reference point between the UE 10 and the AMF 209, and N2 is a reference point between the RAN/AN 230 and the AMF 209. N4 is a reference point between the SMF 206 and the UPF 220, and information is exchanged between these network functions (NFs).

An example of the UE 10 is the terminal device 110 of the present embodiment. An example of the RAN/AN 230 is the base station device 130 of the present embodiment.

Furthermore, the information processing device 150 may be an edge server installed in the 5GC/NGC 20 (or installed in the vicinity of the 5GC/NGC 20), a cloud server (not illustrated), or a cloud server installed on the Internet.

Alternatively, the information processing device 150 may include, for example, a plurality of devices including the 5GC. In this case, the inertial measurement information acquiring unit 1531 may be implemented in the AF 208, and the radio resource allocation requesting unit 1533 may be implemented as one function of the AMF 209 or the SMF 206. The video data generating unit 1532 corresponds to an edge server installed in the 5GC/NGC 20, a cloud server (not illustrated), or a cloud server (not illustrated) installed in the Internet. Furthermore, the video data generating unit 1532 may be implemented in the AF 208.

2. EXAMPLE OF INFORMATION PROCESSING OF CONTENT DISTRIBUTION SYSTEM

Next, an example of information processing executed by the content distribution system 100 will be described.

<2.1. Example of Content Distribution Processing>

Figure 6:
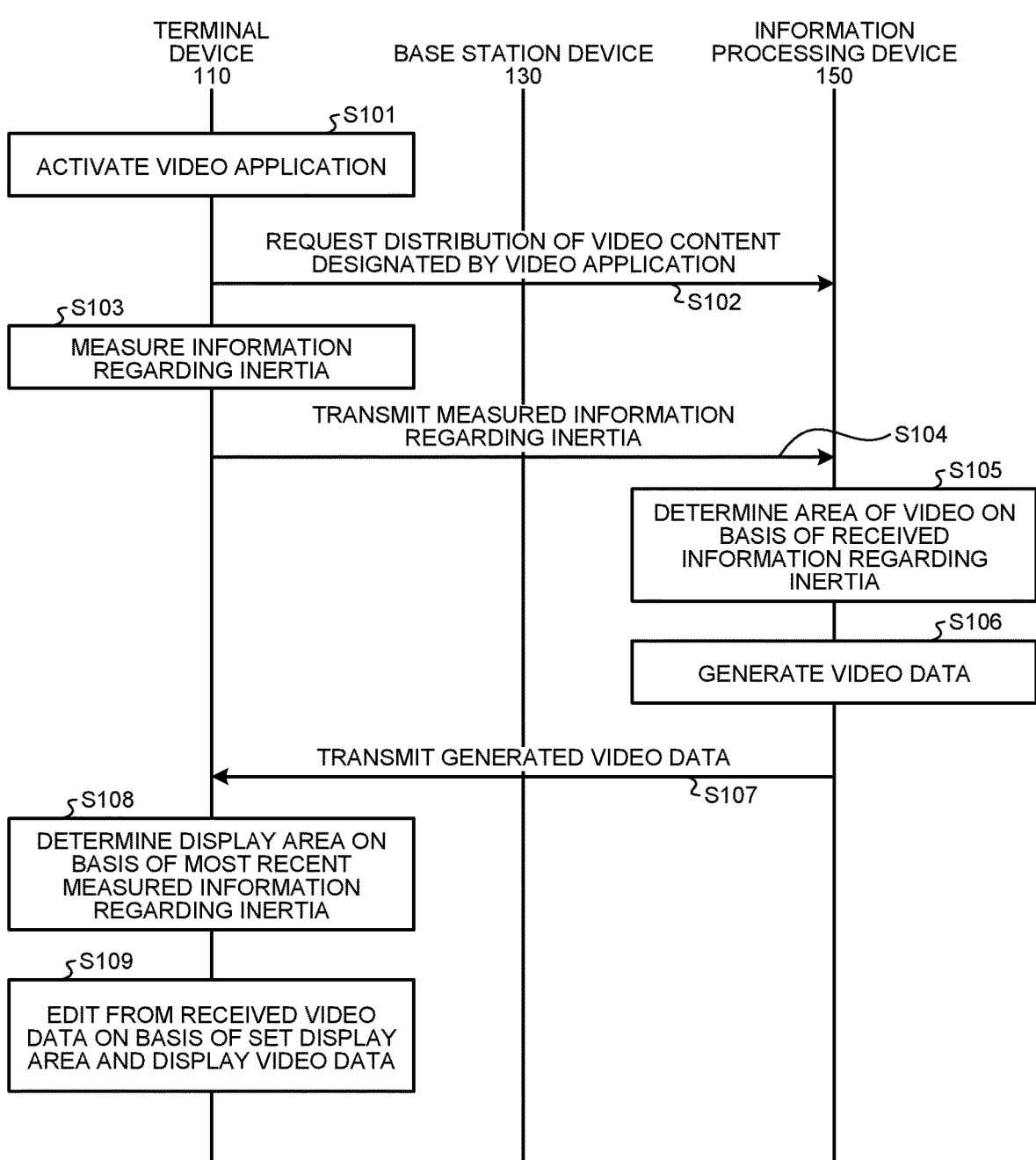
FIG. 6 is a sequence diagram illustrating an example of content distribution processing according to the embodiment of the present disclosure.

FIG. 6 is a sequence diagram illustrating an example of content distribution processing according to the embodiment of the present disclosure.

First, the terminal device 110 activates a video application in response to, for example, a user's instruction (step S101) and requests the information processing device 150 to distribute video content designated by the video application via the base station device 130 (step S102).

The terminal device 110 measures information regarding the inertia (step S103) and transmits the measured information regarding the inertia to the information processing device 150 via the base station device 130 (step S104). Note that the processing of steps S103 and S104 is executed at a constant or variable period or depending on an event.

The information processing device 150 determines an area of a video to be transmitted to the terminal device 110 on the basis of the acquired information regarding the inertia (step S105) and generates video data of the determined area (step S106).

The information processing device 150 transmits the generated video data to the terminal device 110 via the base station device 130 (step S107).

The terminal device 110 determines a display area of the acquired video data on the basis of the most recent measured information regarding the inertia (step S108). The terminal device 110 generates an image to be displayed in each frame from the acquired video data in alignment with the determined display area, edits the video, and then displays the video on the display unit 116 (step S109).

<2.2. Example of Rendering Processing>

Figure 7:
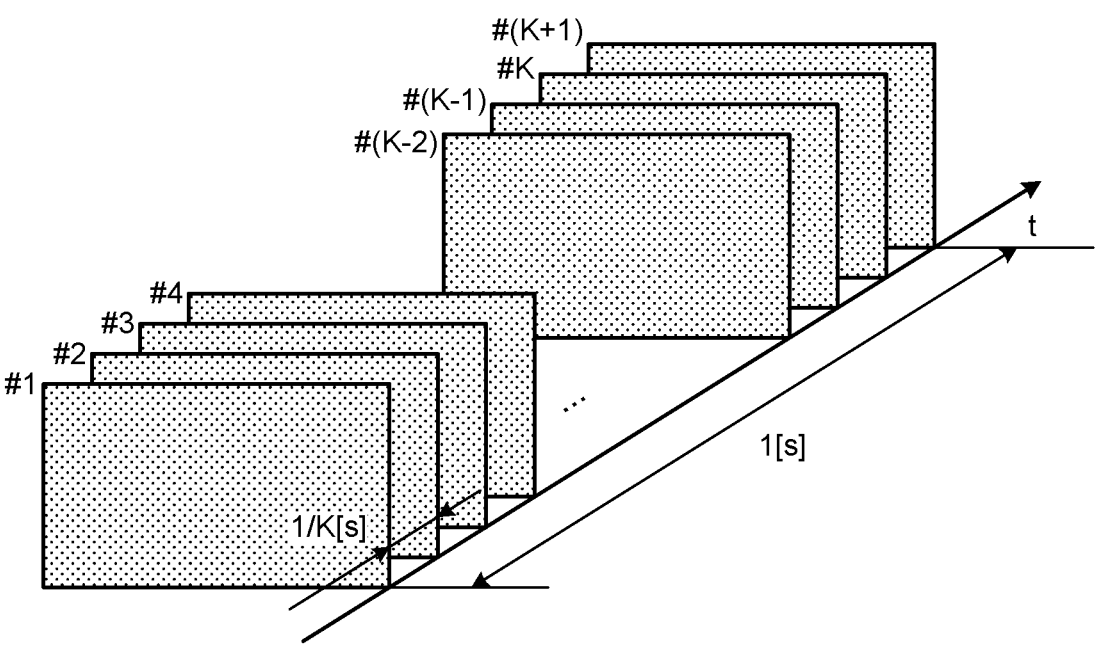
FIG. 7 is a diagram for describing an example of rendering processing according to the embodiment of the disclosure.

Next, an example of rendering processing executed by the terminal device 110 will be described by referring to FIG. 7. FIG. 7 is a diagram for describing an example of rendering processing according to the embodiment of the disclosure. The rendering processing described here is executed in step S109 in FIG. 6, for example.

Illustrated in FIG. 7 is timing at which images (hereinafter, also referred to as frame images) generated by the terminal device 110 are displayed, in other words, timing of displaying the frame images.

The terminal device 110 displays a video on the display unit 116 by updating (generating) a frame image, which is a still image, in a period corresponding to a frame rate.

For example, in a case where the frame rate is K [fps], K frame images #n (n is an integer in a range between 1 and (K+1)) are generated in one second and displayed on the display unit 116. In this case, the update period of the frame image is 1/K seconds.

Figure 8:
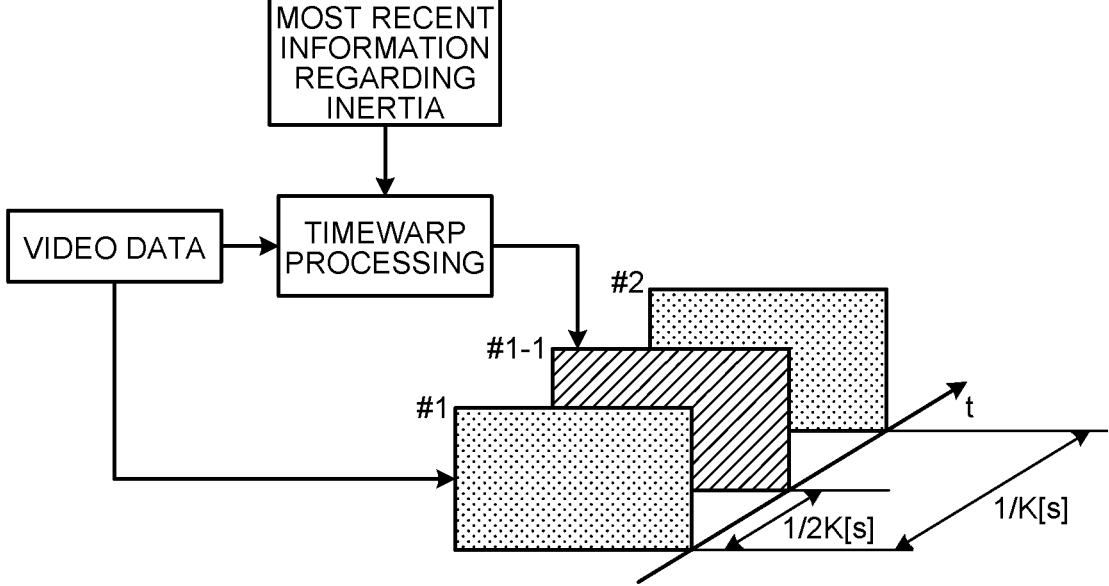
FIG. 8 is a diagram for describing another example of rendering processing according to the embodiment of the disclosure.

Next, another example of rendering processing executed by the terminal device 110 will be described by referring to FIG. 8. FIG. 8 is a diagram for describing another example of rendering processing according to the embodiment of the disclosure. The rendering processing described here is executed in step S109 in FIG. 6, for example.

There are cases where drawing of frame images is performed using technology called timewarp when rendering processing of frame images is performed. Time warping is technology of generating an image of a display area estimated on the basis of acquired video data and the most recent information regarding the inertia in order to keep the motion-to-photon latency less than or equal to a certain value. As one application example of the timewarp, the rendering unit 1153 sets the frame rate for display on the display unit 116 to m times (m>1) the frame rate of the video data acquired from the information processing device 150.

Furthermore, the rendering unit 1153 may apply the timewarp to drawing of each frame image in order to keep the motion-to-photon latency within a certain value under a delay environment caused by wireless communication between the information processing device 150 and the terminal device 110.

In VR, it is known that a phenomenon called VR sickness occurs due to a "deviation" between a screen viewed in front of the eyes by a head mounted display (HMD) and the sensation of one's own body. For example, in a case where the user turns around and the scene on the screen changes, there is a case where the scene actually displayed on the HMD in front of the eyes is displayed with a slight delay from a scene that the user assumes right with his or her own sensation. Such a delay is called motion-to-photon latency. Alternatively, when the user recognizes the depth (space) and moves, there is a case where the scene actually displayed on the HMD in front of the eyes is shifted from a scene that the user expects to view after the movement. In a case where such a delay or a deviation occurs, VR sickness is likely to occur.

As a method of improving this VR sickness, a method of increasing the frame rate of frame images displayed on the display unit is known. By increasing the frame rate, a difference between a scene assumed by the user and a scene actually displayed on the display unit is reduced, which can suppress occurrence of VR sickness.

Furthermore, the VR sickness can be improved by applying the above-mentioned timewarp and reducing the motion-to-photon latency.

In the rendering processing described by referring to FIG. 7, the frame rate is K [fps], and a frame image is updated every 1/K seconds. More specifically, the terminal device 110 generates frame images #1, #2, . . . each from the video data acquired from the information processing device 150 at every 1/K seconds. At this point, the terminal device 110 generates the frame images #1, #2, . . . using the video data acquired each time.

Therefore, in a case where the terminal device 110 attempts to increase the frame rate in order to suppress occurrence of VR sickness, for example, it is necessary to shorten the period of acquiring the video data, which adversely increases the load on the wireless communication.

Therefore, the terminal device 110 increases the frame rate of the frame images to be displayed on the display unit 116 without changing the period of acquiring the video data from the information processing device 150 by using the timewarp technology.

As illustrated in FIG. 8, the terminal device 110 generates a frame image #1 using acquired video data D1 and displays the frame image #1 on the display unit 116. The terminal device 110 further generates a frame image #1-1 using the acquired video data D1 and displays the frame image #1-1 on the display unit 116. At this point, the terminal device 110 performs timewarp processing on the video data D1 using the most recent information regarding the inertia to generate the frame image #1-1. The terminal device 110 determines the viewpoint of the user or the field of view including the viewpoint by using the most recent information regarding the inertia and determines the display area on the basis of the determined line-of-sight direction. This display area is also referred to as a viewport. The terminal device 110 extracts the determined display area from the video data D1 and generates the frame image #1-1. Note that, in this case, the information regarding the inertia can be measured, for example, in a period shorter than the display period of the frame image displayed on the display unit 116.

As described above, the terminal device 110 can increase the frame rate without shortening the acquisition period of video data by generating a plurality of frame images from one piece of video data by using the most recent information regarding the inertia measured at different times. For example, in FIG. 8, the terminal device 110 generates two frame images #1 and #1-1 from one piece of video data D1. As a result, the terminal device 110 can shorten the period (hereinafter also referred to as a frame period) for display on the display unit 116 to ½ as compared with a case where one frame image #1 is generated from one piece of video data D1.

The terminal device 110 can reduce the motion-to-photon latency and suppress VR sickness by reflecting a change in information regarding the inertia to the same video data and shorting the frame period. As described above, a method of reflecting a change in information regarding the inertia to the same video data is called the timewarp or asynchronous timewarp (ATW). By applying the timewarp or the asynchronous timewarp, it is possible to reduce the motion-to-photon latency and to shorten the frame period.

<2.3. Example of Communication Processing>

Next, an example of communication processing executed in the content distribution system 100 will be described by referring to FIGS. 9 to 11. As described above by referring to FIG. 5, the NR network architecture is applied in the content distribution system 100.

Here, in the NR network architecture, in order for the UE 10 to receive provision of services via the 5GC/NGC 20, for example, registration to the 5GC/NGC 20 is performed. The UE 10 selects, for example, a public land mobile network (PLMN) corresponding to 5GC/NGC 20 and executes a registration procedure.

Hereinafter, an example of communication processing performed for the UE 10 to receive provision of services via the 5GC/NGC 20 including such registration processing will be described by referring to FIGS. 9 to 11.

(Registration Processing)

First, registration processing performed by the UE 10 will be described by referring to FIG. 9. FIG. 9 is a sequence diagram illustrating an example of registration processing according to the embodiment of the disclosure.

Figure 9:
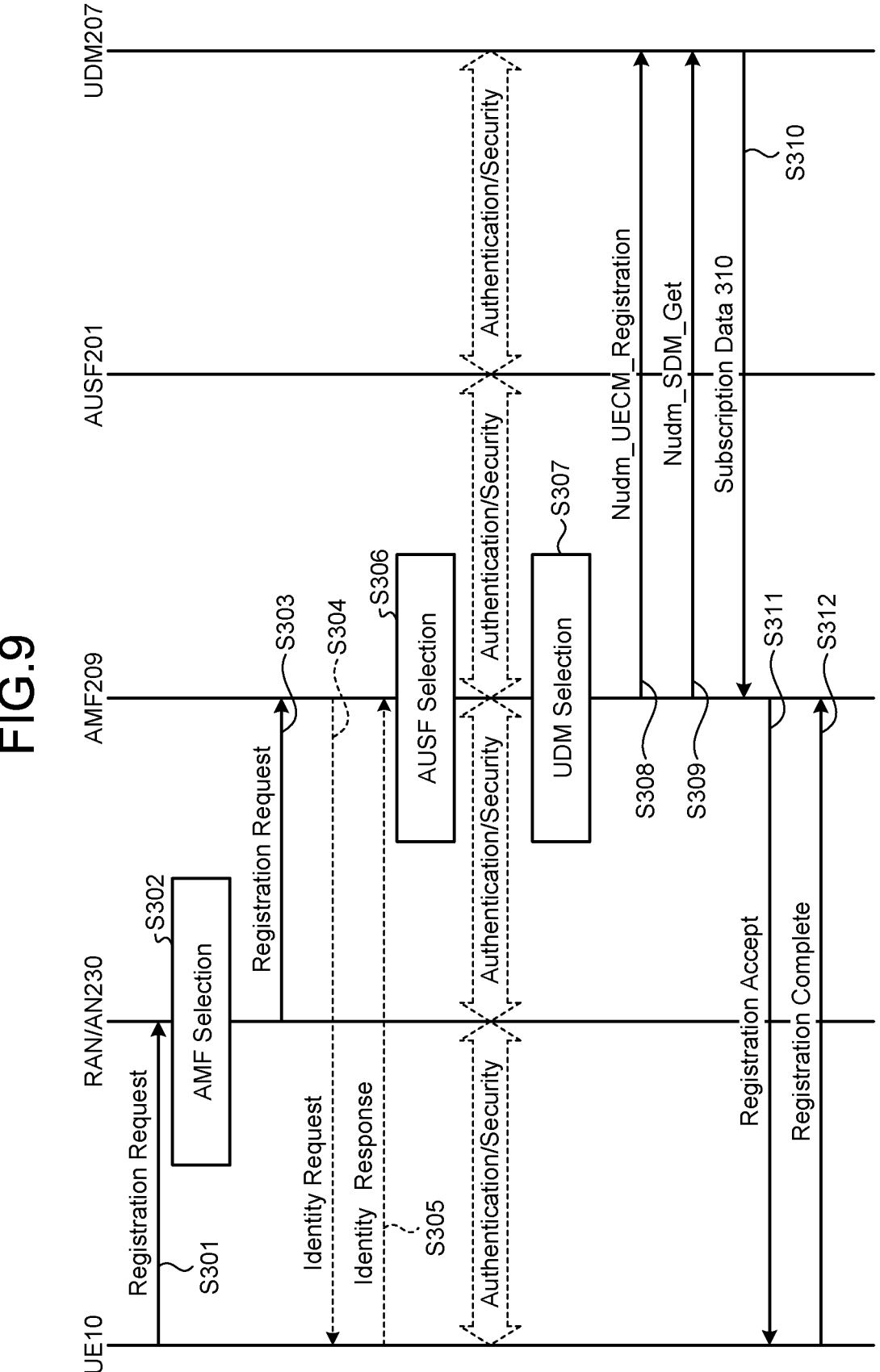
FIG. 9 is a sequence diagram illustrating an example of registration processing according to the embodiment of the disclosure.

As illustrated in FIG. 9, the UE 10 in the RM-DEREG-ISTERED state, that is, in an unregistered state in the 5GC/NGC 20 sends a registration request (Registration Request) message to the RAN/AN 230 in order to execute initial registration (Initial Registration) (step S301). At this point, the UE 10 sends the registration request message by including the UE identity therein.

The UE identity is a 5G-GUTI mapped from EPS GUTIs in a case where it has a valid EPS GUTI. Here, the evolved packet system (EPS) refers to a 4G system corresponding to long term evolution (LTE) and includes an EUTRAN and an EPC. A globally unique temporary identifier (EPS GUTI) is a temporary ID used to identify a UE in an EPS from the viewpoint of security instead of an ID uniquely allocated to each UE such as an international mobile subscriber identity (IMSI) or an international mobile equipment identity (IMEI).

Alternatively, the UE identity is, if available, a PLMN-specific 5G-GUTI assigned by the PLMN with which the UE 10 is attempting to be registered.

Alternatively, the UE identity is, if available, a PLMN-specific 5G-GUTI assigned by a PLMM that is regarded as an equivalent public land mobile network (PLMN) to the PLMN that the UE 10 is attempting to be registered with.

Alternatively, the UE identity is, if available, a PLMN-specific 5G-GUTI assigned by any PLMN.

Otherwise, the UE 10 includes the subscription concealed identifier (SUCI) in the registration request message. The SUCI is an ID obtained by encrypting a subscription permanent identifier (SUPI) which is an ID uniquely assigned to each UE 10.

The UE 10 includes mapping of each single NSSAI (S-NSSAI) of Requested NSSAI with an S-NSSAI of a home PLMN (HPLMN) in the registration request message. As a result, it can be confirmed whether the S-NSSAI(s) of the Requested Network Slice Selection Assistance Information (NSSAI) can be permitted on the basis of the Subscribed S-NSSAIs.

In addition, in a case where the UE 10 uses Default Configured NSSAI, the UE includes Default Configured NSSAI Indication in the registration request message.

Here, the S-NSSAI includes a set of a mandatory Slice/Service Type (SST) for identifying the slice type and an optional Slice Differentiator (SD) for differentiating different slices in the same SST. Note that the mandatory SST has 8 bits, and the optional SD has 24 bits.

Note that all or each of services for applications of AR, VR, mixed reality (MR), substitutional reality (SR), and X reality or extended reality (XR) may be defined as slices identified by the S-NSSAI. In other words, services for AR, VR, MR, SR, or XR applications may be implemented by one or a plurality of network slices. That is, one or a plurality of pieces of S-NSSAI may be associated with services for applications of AR, VR, MR, SR, or XR.

Here, AR is also called augmented reality and is, for example, technology of augmenting a virtual world such as a 3D video or a character created by computer graphics (CG) by superimposing the virtual world on the real world.

VR is also referred to as virtual reality and is technology that allows experience of a virtual world by CG or an all-around video taken by a 360° camera, or the like.

MR is also called mixed reality and is technology for more realistically expressing a virtual world by closely fusing the real world and the virtual world.

SR is also called substitutional reality and is technology for replacing a virtual world with the real world to be recognized.

XR is a generic name of the technology that creates an experience in which some change is added to the real world including AR, VR, MR, and SR.

After receiving the registration request message from the UE 10, the RAN/AN 230 executes AMF Selection (step S302). If the registration request message does not include a 5G S-Temporary Mobile Subscription Identifier (5G-S-TMSI) nor a Globally Unique AMF Identifier (GUAMI), the RAN/AN 230 selects the AMF 209 on the basis of Radio Access Technology ((R)AT) and, if available, Requested NSSAI. Alternatively, in a case where 5G-S-TMSI or GUAMI does not indicate a valid AMF 209 in the registration request message, the RAN/AN 230 selects the AMF 209 on the basis of Radio Access Technology ((R)AT) and, if available, Requested NSSAI.

In a case where the RAN/AN 230 is an NG-RAN, a registration request including a selected PLMN ID or a combination of a PLMN ID for identifying a standalone non-public network (SNPN) and a network identifier (NID) is transferred to the AMF 209 (step S303).

If the UE 10 has not provided the SUCI to the AMF 209, the AMF 209 initiates Identity Request processing, sends an Identity Request message to the UE 10, and requests for the SUCI (step S304).

If the Identity Request message is received in step S304, the UE 10 responds with an Identity Response message including the SUCI (step S305). Incidentally, the UE 10 may obtain the SUCI by using a public key of the HPLMN.

The AMF 209 executes AUSF Selection on the basis of the SUPI or the SUCI (step S306) and activates authentication of the UE 10.

After receiving a request for authentication from the AMF 209, the AUSF 201 needs to execute authentication of the UE 10.

The AUSF 201 selects the UDM 207 as the authentication processing and acquires authentication data from the UDM 207.

After the UE 10 is authenticated, the AUSF 201 provides security information to the AMF 209.

After successful authentication on the AMF 209, the AMF 209 initiates NG Application Protocol (NGAP) processing and provides a security context to the RAN/AN 230.

The RAN/AN 230 holds the security context and returns a response to the AMF 209.

Hereinafter, the RAN/AN 230 uses this security context to protect messages exchanged with the UE 10.

The AMF 209 executes UDM Selection on the basis of the SUPI and selects the UDM 207 (step S307).

The AMF 209 is registered in the UDM 207 using Nudm_UECM_Registration (step S308).

In a case where the AMF 209 does not have subscription data of the UE 10, Nudm_SDM_Get is used (step S309) to acquire Subscription Data such as Access and Mobility Subscription data and SMF Selection Subscription data (step S310).

The AMF 209 generates a UE context after acquiring the access and mobility subscription data from the UDM 207. The access and mobility subscription data includes information indicating whether or not NSSAI can be included in plaintext in RRC connection establishment in the 3GPP access.

The AMF 209 sends registration permission (Registration Accept) to the UE 10 (step S311). The registration permission message includes the 5G-GUTI and Registration Area. A N2 message including the registration permission message includes an Allowed NSSAI.

The Allowed NSSAI includes only S-NSSAIs that do not request network slice-specific authentication or authorization on the basis of contractor information or S-NSSAIs that have succeeded in network slice-specific authentication and authorization on the basis of the UE context of the AMF 209.

In addition, the AMF 209 may provide a list of equivalent PLMNs to the UE 10 registered in the PLMN, however, the AMF 209 must not provide the list of equivalent PLMNs to a UE 10 registered in an SNPN.

The UE 10 sends a registration complete (Registration Complete) message to the AMF 209 in order to notify that a new 5G-GUTI is assigned (step S312).

According to the above registration processing, the UE 10 enters a registered state with respect to the 5GC/NGC 20, that is, the RM-REGISTERED state.

(PDU Session Establishing Processing)

Next, PDU session establishing processing performed by the UE 10 will be described by referring to FIG. 10. FIG. 10 is a sequence diagram illustrating an example of the PDU session establishing processing according to the embodiment of the disclosure.

Figure 10:
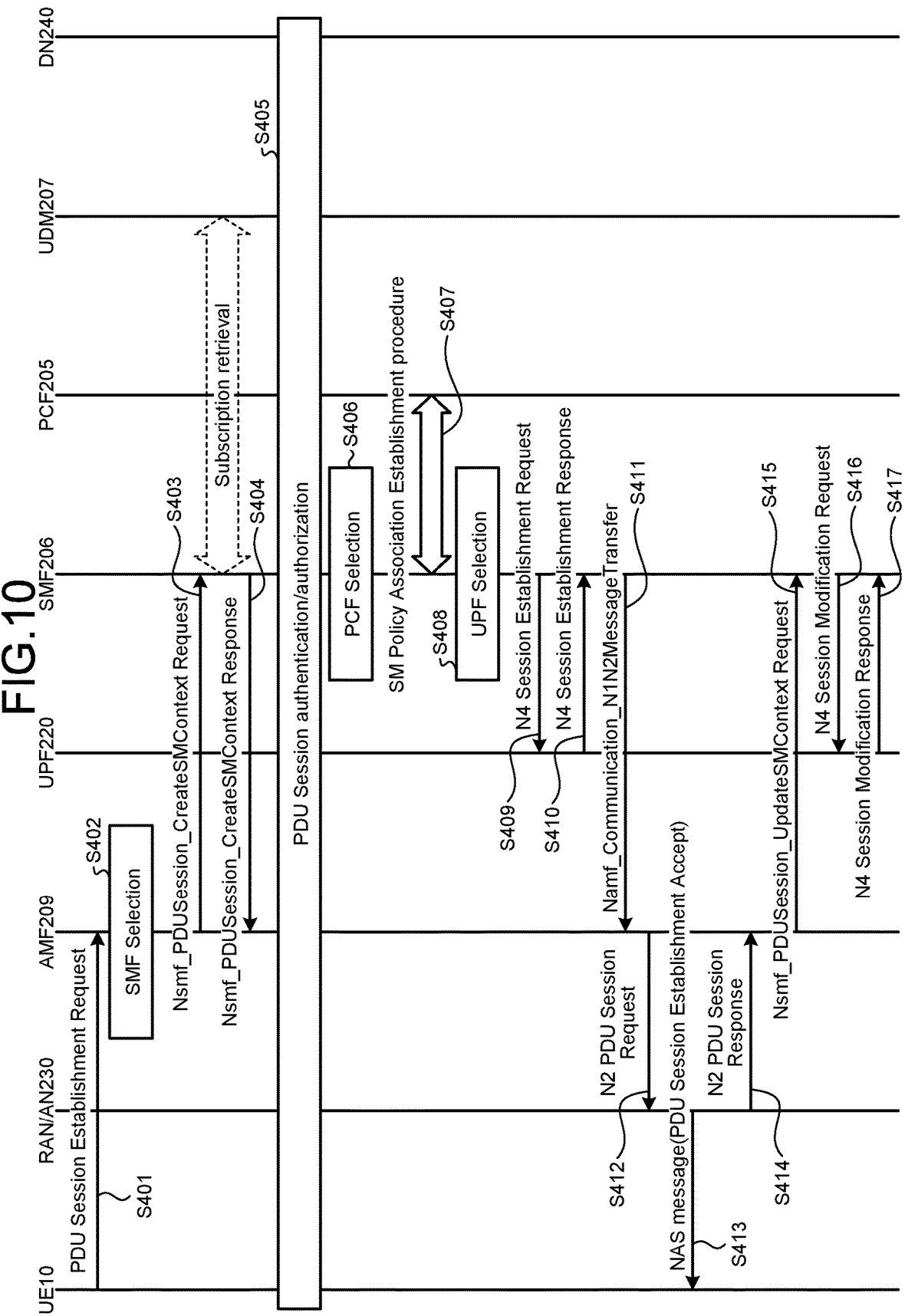
FIG. 10 is a sequence diagram illustrating an example of PDU session establishing processing according to the embodiment of the disclosure.
Figure 11:
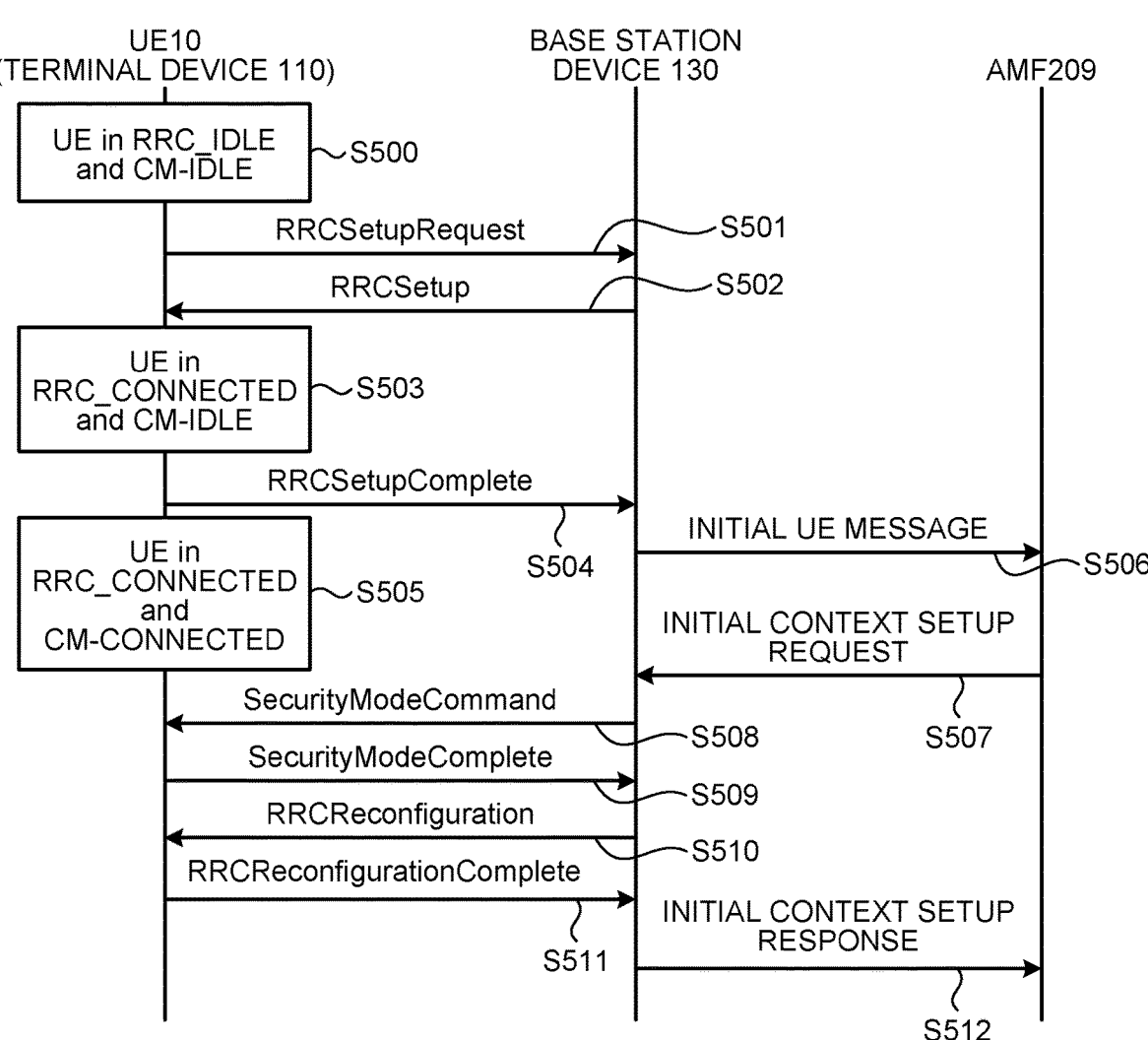
FIG. 11 is a sequence diagram illustrating an example of RRC_CONNECTED transition processing according to the embodiment of the disclosure.

As illustrated in FIG. 10, the UE 10 registered in the AMF 209 sends a PDU session establishment request message (PDU Session Establishment Request) to the AMF 209 (step S401). Here, the PDU session establishment request message includes an S-NSSAI corresponding to a requested service in the Allowed NSSAI and UE Requested Data Network Name (DNN). The UE Requested DNN is, for example, a DNN that enables connection to AR, VR, MR, SR, or XR services.

After receiving the PDU session establishment request message, the AMF 209 executes SMF Selection (step S402). Here, in a case where the PDU session establishment request message includes the S-NSSAI but not the DNN, a default DNN for the S-NSSAI is selected as the DNN. For example, let us presume that all or each of services for applications of AR, VR, MR, SR, or XR is defined as a slice identified by a specific S-NSSAI. In this case, the default DNN for a specific S-NSSAI is a DNN that enables connection to AR, VR, MR, SR, or XR services.

The AMF 209 sends Nsmf_PDUSession_CreateSMContext Request including the S-NSSAI of the Allowed NSSAI to the selected SMF 206 (step S403). Here, Nsmf_PDUSession_CreateSMContext Request includes the SUPI, the S-NSSAI, the UE Requested DNN, or the DNN.

If Session Management Subscription data corresponding to the SUPI, the DNN, or the S-NSSAI is not available, the SMF 206 acquires the Session Management Subscription data from the UDM 207 by using Nudm_SDM_Get. Furthermore, the SMF 206 performs registration using Nudm_SDM_Subscribe so as to be notified when the Session Management Subscription data is updated.

The SMF 206 that has received the Nsmf_PDUSession_CreateSMContext Request generates an SM context if the PDU session establishment request can be processed. Then, the SMF 206 responds Nsmf_PDUSession_CreateSMContext Response to the AMF 209 to provide an SM Context ID (step S404).

If it is necessary to execute second authentication and authorization processing by a DN-AAA server during the establishment of the PDU session, the SMF 206 initiates PDU Session establishment authentication/authorization processing (step S405).

In a case where dynamic policy and charging control (PCC) is applied to the PDU session to be established, the SMF 206 executes PCF Selection (step S406). Otherwise, the SMF 206 may apply a local policy.

In addition, the SMF 206 may execute an SM Policy Association Establishment procedure, in order to establish SM Policy Association with the PCF 205 and to acquire default PCC Rules for the PDU session (step S407). Thereby, the PCC Rules can be acquired before the UPF 220 is selected.

The SMF 206 executes UPF Selection to select one or more UPFs 220 (step S408).

The SMF 206 sends an N4 session establishment request (N4 Session Establishment Request) message to the selected UPF(s) 220 (step S409).

The UPF 220 returns an N4 session establishment response (N4 Session Establishment Response) message to respond to the SMF 206 (step S410).

If a plurality of UPFs 220 is selected for the PDU session, the N4 session establishing processing is initiated for each of the UPFs 220.

The SMF 206 sends a Namf_Communication_N1N2MessageTransfer message to the AMF 209 (step S411). Incidentally, the Namf_Communication_ N1N2-MessageTransfer message includes a PDU Session ID, N2 SM information, CN Tunnel Info, the S-NSSAI of the Allowed NSSAI, and an N1 SM container. The N2 SM information includes the PDU Session ID, (a) QFI(s), (a) QoS Profile (s), and others. In addition, in a case where a plurality of UPFs 220 is used for the PDU session, CN Tunnel Info includes tunnel information related to the plurality of UPFs 220 that terminates N3.

The N1 SM container includes PDU Session Establishment Accept that the AMF 209 has to provide to the UE 10. Moreover, the PDU Session Establishment Accept includes the S-NSSAI of the Allowed NSSAI.

The Namf_Communication_N1N2MessageTransfer message includes the PDU Session ID so that which access the AMF 209 uses for the UE 10 is clear.

The AMF 209 sends an N2 PDU session request (N2 PDU Session Request) message to the RAN/AN 230 (step S412). At this point, the AMF 209 transmits, to the RAN/AN 230, via the N2 PDU session request message, a non-access-stratum (NAS) message including the PDU session ID and the PDU session establishment permission (PDU Session Establishment Accept), which is addressed to the UE 10, and the N2 SM information received from the SMF 206.

The RAN/AN 230 forwards the NAS message including the PDU Session ID and the N1 SM container to the UE 10 (step S413). Incidentally, the N1 SM container includes the PDU Session Establishment Accept.

The RAN/AN 230 responds to the AMF 209 with an N2 PDU session response (N2 PDU Session Response) message (step S414).

The AMF 209 forwards the N2 SM information received from the RAN/AN 230 to the SMF 206 via the Nsmf_P-DUSession UpdateSMContext Request message including the SM Context ID and the N2 SM information (step S415).

The SMF 206 initiates an N4 session modification procedure (N4 Session Modification procedure) with the UPF 220 and sends an N4 session modification request (N4 Session Modification Request) message to the UPF 220

(step S416). The SMF 206 provides AN tunnel information (AN Tunnel Info) to the UPF 220 in addition to a forwarding rule.

The UPF 220 responds to the SMF 206 with an N4 session modification response (N4 Session Modification Response) message (step S417). In a case where a plurality of UPFs 220 is used in the PDU session, the above-described N4 session modification procedure is performed on all the UPFs 220 that terminate N3.

The PDU session is established in accordance with the above processing.

Note that, a QoS Profile must include QoS parameters for each QoS flow. The QoS parameters are, for example, a 5G QoS Identifier (5QI) and an Allocation and Retention Priority (ARP).

A QoS flow may be either "Guaranteed Bit Rate (GBR)" or "Non-GBR" depending on the QoS Profile.

For a Non-GBR QoS flow, the QoS profile may include a QoS parameter called reflective QoS attribute (RQA).

For a GBR QoS flows, QoS parameters called Guaranteed Flow Bit Rate (GFBR) and Maximum Flow Bit Rate (MFBR) for uplink and downlink must be included.

The 5QI is a parameter for an access node for controlling transfer processing of a QoS flow. For example, scheduling weights, an admission threshold value, a queue management threshold value, link layer settings, and the like are included.

The ARP includes information regarding a priority level, pre-emption capability, and pre-emption vulnerability.

The priority level of the ARP defines the relative importance of the QoS flow and is set in a range between 1 to 15 with the highest importance being 1.

The pre-emption capability of the ARP is an index that defines whether or not a QoS flow can use a resource already allocated to another QoS flow with a lower priority level.

The pre-emption vulnerability of the ARP is an index that defines whether or not a resource allocated to the QoS flow is to be yielded in order to accept another QoS flow having a higher priority level.

Either "enabled" or "disabled" needs to be set in the pre-emption capability of the ARP and the pre-emption vulnerability of the ARP.

(RRC_CONNECTED Transition Processing)

Signaling between the UE 10 and the core network (for example, AMF 209) is performed by NAS signaling. NAS signaling connection is used to enable this NAS signaling.

The NAS signaling connection includes AN signaling connection between the UE 10 and an access network (AN) and N2 connection between the AN and the AMF 209. Incidentally, the AN signaling connection is, for example, a Radio Resource Control (RRC) connection.

Therefore, RRC_CONNECTED transition processing of causing the RRC state of the UE 10 to transition from RRC_IDLE to RRC_CONNECTED will be described by referring to FIG. 11. FIG. 11 is a sequence diagram illustrating an example of RRC_CONNECTED transition processing according to the embodiment of the disclosure. The RRC_CONNECTED transition processing is initiated by the UE 10 (an example of the terminal device 110) in a case where transition is made from RRC_IDLE to RRC_CONNECTED.

First, it is based on the premise that the UE 10 is in the RRC_IDLE and CM-IDLE states (step S500). Here, the RRC_IDLE state is a state in which an RRC connection is not established with the base station device 130. The CM-IDLE state is a state in which no NAS signaling connection via N1 is established with the AMF 209.

The UE 10 sends an RRC configuration request (RRC-SetupRequest) message via Signalling Radio Bearer (SRB) 0 for a new connection with the base station device 130 (step S501).

After receiving the RRC configuration (RRCSetup) message from the base station device 130 (step S502), the UE 10 shifts the RRC state from RRC_IDLE to RRC_CONNECTED and maintains CM-IDLE as it is (step S503).

After receiving a RRC configuration complete (RRCSetupComplete) message from the UE 10 (step S504), the base station device 130 completes the RRC configuration processing, and the UE 10 transitions to CM-CONNECTED (step S505).

The first NAS message (INITIAL UE MESSAGE) from the UE 10, which has been transmitted by being included in the RRC configuration complete (RRCSetupComplete) message, is transmitted to the AMF 209 (step S506).

Here, the first NAS message is, for example, the registration request (Registration Request) message (see step S301 in FIG. 9) or the PDU session establishment request (PDU Session Establishment Request) message (step S401 in FIG. 10). In addition, some NAS messages are exchanged between the UE 10 and the AMF 209.

The AMF 209 prepares UE context data and transmits the UE context data to the base station device 130 via an initial context setup request (INITIAL CONTEXT SETUP REQUEST) message (step S507). Incidentally, the UE context data includes a PDU session context, Security Key, UE Radio Capability, UE Security Capabilities, and others.

After the base station device 130 transmits the SecurityModeCommand message to the UE 10 (step S508) and the UE 10 transmits the SecurityModeComplete message to the base station device 130 via SRB1 (step S509), the base station device 130 activates the Access-Stratum (AS) security.

In order to configure SRB2 and data radio bearers (DRBs), the base station device 130 transmits an RRC reconfiguration (RRCReconfiguration) message to the UE 10 (step S510), and after the UE 10 transmits an RRC reconfiguration complete (RRCReconfigurationComplete) message to the base station device 130 via SRB1 (step S511), the RRC reconfiguration processing is completed.

The base station device 130 transmits an initial context setup complete (INITIAL CONTEXT SETUP RESPONSE) message to the AMF 209 (step S512), thereby notifying that the configuration processing is completed.
(Setting SPS-Config and ConfiguredGrantConfig)

In a case where a PDU session establishment request message (see step S401 in FIG. 10) including an S-NSSAI corresponding to a specific service (for example, S-NSSAI1) is received from the terminal device 110, the AMF 209 selects the SMF 206 for providing the services corresponding to the S-NSSAI1. Here, the specific services are, for example, services for applications of AR, VR, MR, SR, or XR.

In addition, the SMF 206 selected for providing the services corresponding to the S-NSSAI1 selects, for example, the PCF 205 and the UPF 220 necessary for provision of services for applications of AR, VR, MR, SR, or XR.

Furthermore, for example, the base station device 130 may separately determine SPS-Config and ConfiguredGrantConfig to be configured for downlink and uplink with the terminal device 110 in response to an instruction by the AMF 209.

The base station device 130 can set SPS-Config and ConfiguredGrantConfig in the terminal device 110 via RRC.

For example, the base station device 130 performs setting in the terminal device 110 by transmitting the RRC reconfiguration message (see step S508 in FIG. 11) by including SPS-Config and ConfiguredGrantConfig therein.

SPS-Config is used to configure semi-persistent transmission for downlink. A plurality of pieces of Semi-Persistent Scheduling (SPSs) can be configured for one Bandwidth Part (BWP) of a serving cell. The plurality of SPSs is configured by SPS-ConfigList.

In addition, the base station device 130 can also set ConfiguredGrantConfig by a method via a PDCCH specifying a CS-Radio Network Temporary Identifier (RNTI) called type 2, in addition to the method called type 1 via the above-described RRC.

An SPS-Config information element included in an RRC message includes fields of periodicity, periodicityExt, and SPS-ConfigIndex.

Here, in a case where periodicityExt is not included in the SPS-Config information element, the periodicity is referred to, and in a case where periodicityExt is included, the periodicity is ignored.

In T538.331, values of 10 ms, 20 ms, 32 ms, 40 ms, 64 ms, 80 ms, 128 ms, 160 ms, 320 ms, and 640 ms are defined as the periodicity of SPS-Config.

Moreover, periodicityExt of SPS-Config is defined so that any number of slots between 1 slot and 640 slots can be set as the periodicityExt in a case where subcarrier spacing (SCS) is 15 kHz. Furthermore, in a case where the SCS is 30 kHz, the number of slots is defined so that any number of slots between 1 slot and 1280 slots can be set as the periodicityExt. In a case where the SCS is 60 kHz, the number of slots is defined so that any number of slots between 1 slot and 2560 slots can be set as the periodicityExt. In a case where the SCS is 120 kHz, the number of slots is defined so that any number of slots between 1 slot and 5120 slots can be set as the periodicityExt.

When SPS is configured, a MAC entity needs to determine that an Nth downlink allocation occurs in a slot (Slot#_N) in a system frame number (SFN) satisfying the following Equation (1).

$$(\text{numberOfSlotsPerFrame} \times SFN + \text{Slot\#\_}N) = [(\text{numberOfSlotsPerFrame} \times \text{SFNinit} + \text{slotinit}) + N \times \text{periodicity} \times \text{numberOfSlotsPerFrame}/10] \text{modulo} \ (1024 \times \text{numberOfSlotsPerFrame}) \quad (1)$$

Incidentally, numberOfSlotsPerFrame is the number of slots (for example, 10 in a case where the SCS is 15 kHz) in a radio frame, and SFNinit and slotinit are SFN and slot #, respectively, in which SPS is configured and the first transmission in a physical downlink shared channel (PDSCH) has been performed.

In addition, in order to continuously allocate a plurality of slots as SPS resources on the time axis, a parameter called numberOfSlotsPerSPS may be further introduced. The MAC entity determines that an Nth downlink allocation occurs in slots, the number of which corresponding to numberOfSlotsPerSps, which are consecutive starting from the slot (Slot#_N) in the SFN satisfying the above Equation (1).

ConfiguredGrantConfig information element includes fields of periodicity, periodicityExt, and ConfiguredGrantConfigIndex.

Here, in a case where periodicityExt is not included in the ConfiguredGrantConfig information element, the periodicity is referred to, and in a case where periodicityExt is included, the periodicity is ignored.

In TS38.331, as the periodicity of ConfiguredGrantConfig, for example, 2, 7, and 14 symbols are defined in a case where the SCS is 15 kHz. Incidentally, n is a value of any one of 1, 2, 4, 5, 8, 10, 16, 20, 32, 40, 64, 80, 128, 160, 320, and 640.

Furthermore, as for periodicityExt in ConfiguredGrant-Config, for example, in a case where the SCS is 15 kHz, the number of symbols is defined so that any number of symbols between 1 symbol and 640 symbols can be set as the periodicityExt, and a period of periodicityExt* 14 symbols can be set.

When configured grant (CG) is configured, the MAC entity needs to determine that an Nth uplink allocation occurs in a symbol (Symbol#_N) in Slot# of a system frame number (SFN) satisfying the following Equation (2).

$$[(SFN \times numberOfSlotsPerFrame \times numberOfSymbol-sPerSlot)+(Slot\# \times numberOfSymbolsPerSlot)+Symbol\#\_N]=(timeDomainOffset \times numberOfS-ymbolsPerSlot+S+N \times periodicity)modulo(1024 \times numberOfSlotsPerFrame \times numberOfSymbolsPerSlot) \quad (2)$$

Here, numberOfSlotsPerFrame is the number of slots in the radio frame (for example, 10 in a case where the SCS is 15 kHz), and numberOfSymbolsPerSlot is the number of symbols in the slot (14 in the case of Normal CP). In addition, timeDomainOffset and S are parameters acquired from a start and length indicator value (SLIV). The parameter timeDomainOffset is an offset value of a resource on a time axis where SFN=0, and S is a symbol (Symbol#) to which a physical uplink shared channel (PUSCH) has been allocated first.

In addition, a parameter called numberOfSymbolsPerCg may be further introduced in order to continuously allocate a plurality of symbols on the time axis as CG resources. The MAC entity determines that an Nth uplink allocation occurs in symbols, the number of which corresponding to num-berOfSymbolsPerCg, which are consecutive starting from the symbol (Symbol#_N) in Slot# in the SFN satisfying the above Equation (2).

3. TECHNICAL PROBLEMS

Next, a technical problem of the content distribution system 100 according to the embodiment of the disclosure will be described focusing on, in particular, a case where video data is transmitted by semi-persistent transmission.

Figure 12:
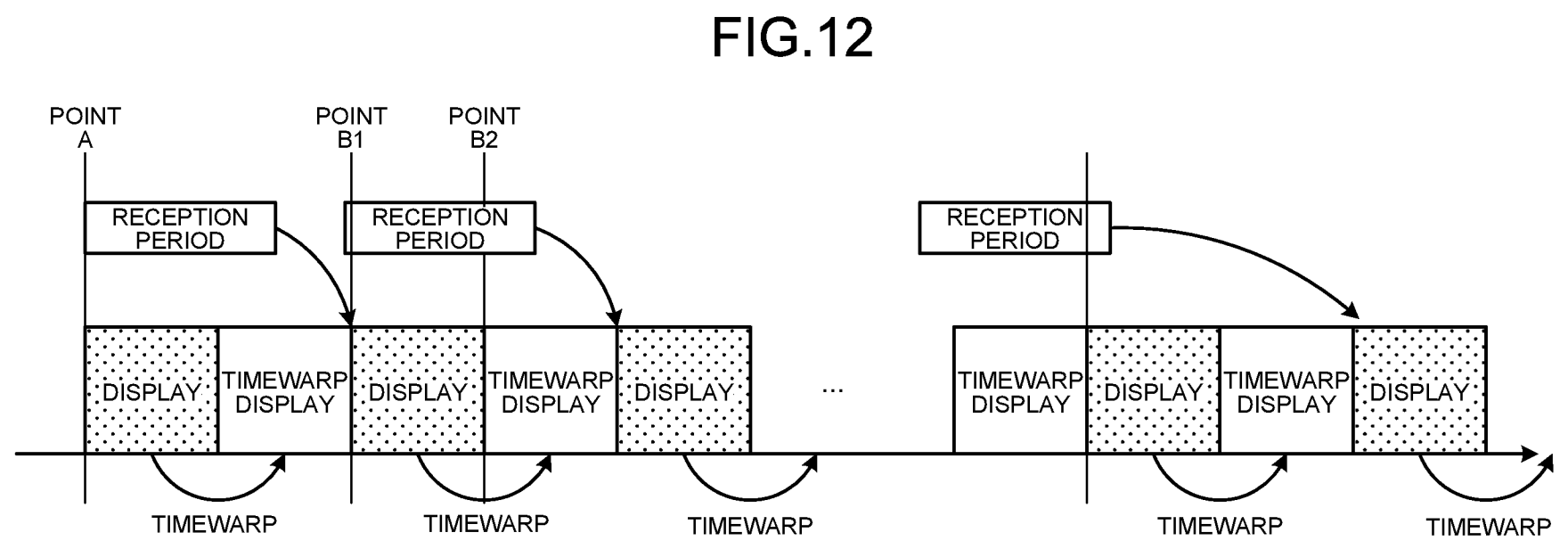

FIG. 12 is a diagram for explaining an example of distribution of video data by the content distribution system. In FIG. 12, video data is communicated between the base station device 130 and the terminal device 110 via SPS. Note that the terminal device 110 displays a video by doubling the frame rate using the above-described timewarp.

For example, the terminal device 110 which is an HMD sends a PDU session establishment request message (see step S401 in FIG. 10) including an S-NSSAI1 to the AMF 209 in order to use XR services. Upon receiving the PDU session establishment request message, the AMF 209 instructs the base station device 130 to set SPS-Config and ConfiguredGrantConfig for downlink and uplink with the terminal device 110, respectively.

The terminal device 110 receives, for example, video data of a frame rate of 45 fps by downlink semi-persistent scheduling (SPS) via the base station device 130. Herein-after, the frame rate of the video data transmitted by the information processing device 150 is also referred to as a first frame rate.

In addition, the terminal device 110 transmits the infor-mation regarding the inertia measured by the inertial mea-surement device 114 by uplink configured grant (CG) via the base station device 130.

The terminal device 110 displays the received video data of the first frame rate (45 fps) as a video of a frame rate of, for example, 90 fps by utilizing timewarp. Hereinafter, the frame rate of the video displayed on the display unit 116 by the terminal device 110 is also referred to as a second frame rate.

The video of the second frame rate (90 fps) is displayed on a display of the terminal device 110 in a period of 11.11 ms. Furthermore, it is desirable that the video data at the first frame rate (45 fps) can be received ideally in a period of 22.22 ms. However, since the SPS period is set for each slot (1 ms in a case where the SCS is 15 kHz), for example, the SPS period is set to 22 ms as an approximate period.

Here, a method of setting the SPS period will be described. Information regarding a format including a frame rate of a video handled by services corresponding to the S-NSSAI1 is stored in, for example, a unified data repository (UDR).

When establishment of a PDU session is requested for provision of services corresponding to the S-NSSAI1, the SMF 206 acquires, from the UDR, information regarding the format including the frame rate of a video handled by the services corresponding to the S-NSSAI1 and provides the information to the AMF 209 via the NAS message.

The AMF 209 determines the SPS period from the acquired information regarding the format of the video and instructs the base station device 130 to configure SPS of the determined period.

Furthermore, the SMF 206 may determine the SPS period on the basis of the information regarding the format includ-ing the frame rate of the video handled by the services corresponding to the S-NSSAI1 acquired from the UDR and provide the SPS period to the base station device 130 via the AMF 209. For example, this SPS period is included in the QoS profile included in the N2 SM information provided by the SMF 206 to the base station device 130 via the AMF 209 or the QoS parameters.

Furthermore, the QoS profile or the QoS parameters may include information for explicitly instructing to configure SPS. For example, "sps-enabled" is set.

Note that the SMF 206 may include the SPS period and information for explicitly instructing to configure SPS, such as "sps-enabled", in Alternative QoS profile provided to the base station device 130.

Alternatively, the information regarding the format including the frame rate of the video handled by the services corresponding to the S-NSSAI1 may be included in PCC Rules provided from the PCF 205 to the SMF 206.

Furthermore, the SMF 206 may define a QoS Flow Identifier (QFI) and a 5G QoS Identifier (5QI) correspond-ing to the format of the video handled by the services corresponding to the S-NSSAI1 or the SPS period and notify the base station device 130 of the QFI and the 5QI.

At the NAS level, a QoS flow is characterized by a QoS profile provided from the 5GC to the base station device 130 and (a) QoS rule(s) provided from the 5GC to the terminal device 110. The QoS profile is used by the base station device 130 to determine how to perform processing on the wireless interface.

The QoS profile includes QoS parameters, and the QoS parameters are, for example, a 5QI and an ARP.

The QoS rule(s) is(are) used to instruct correspondence between uplink user plane data and the QoS flow. For example, the configuration of the CG is included in the QoS rule(s).

Incidentally, the configuration of the CG is information for explicitly instructing a CG period, more specifically, the configuration of the CG, for example, "cg-enabled."

At the AS level, a DRB determines how to process packets at a radio interface. Mapping between QoS flows and DRBs by the base station device 130 is performed on the basis of the QoS profile related to the QFI.

As described above, the terminal device 110 receives the video data in the period of 22 ms and displays the video (frame images) on the display unit 116 in a period of 11.11 ms.

In the example illustrated in FIG. 12, the terminal device 110 receives the video data D1 from point A in a predetermined reception period. The terminal device 110 displays a first video generated from the received video data D1 at next display timing (point B1) after the reception. Furthermore, the terminal device 110 displays (hereinafter, also referred to as timewarp-display) a second video generated from the video data D1 at point B2 as timewarp of the first video displayed at point B1.

The terminal device 110 receives the video data in the period of 22 ms and displays the video in the display period of 11.11 ms. More specifically, the terminal device 110 displays the first video in the period of 22.22 ms and timewarp-displays the second video in the period of 22.22 ms.

In this manner, the period (SPS period) in which terminal device 110 receives the video data is different from the period (first frame rate) in which the terminal device 110 displays the first video. Therefore, even when reception timing of the video data and display timing of the video of the first frame rate (45 fps) are aligned at a certain time point as indicated by point A in FIG. 12, a difference gradually occurs between the reception timing and the display timing. Although this shift is minute, as the shift gradually accumulates, there arises a problem that the delay amount to display becomes too large to be ignored from the viewpoint of motion-to-photon latency, or conversely, too late for display.

Overview of Proposed Technology

Therefore, the present disclosure proposes technology that enables stable display of a video in the terminal device 110 that periodically receives video data and periodically displays a video. As the proposed technology, the base station device 130 modifies the settings regarding reception timing in a case where a difference between periodic reception timing of video data in the terminal device 110 and display timing of a video satisfies a predetermined condition.

4. TECHNICAL FEATURES

<4.1. Reconfiguring SPS>

Figure 13:
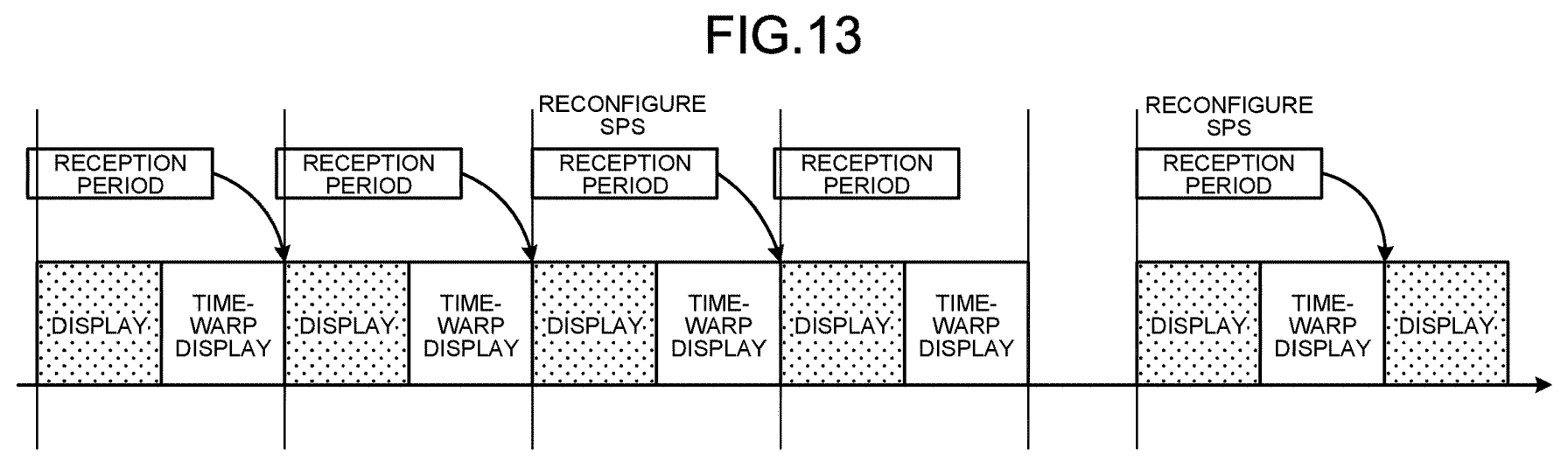

FIG. 13 is a diagram for describing SPS reconfiguration by the base station device 130 according to the embodiment of the disclosure.

As described above, the terminal device 110 receives the video data in a period of 22 ms, and the terminal device 110 displays the first video in a period of 22.22 ms.

In this manner, in a case where the period (SPS period) in which the terminal device 110 receives the video data is different from the period in which the terminal device 110 displays the first video, a shift (difference) is generated between the reception timing and the display timing.

In a case where the absolute value of the difference between the reception timing at which the terminal device 110 receives the video data and the display timing of the first video becomes larger than or equal to a predetermined threshold value, the base station device 130 reconfigures SPS. The base station device 130 resets the current SPS configuration and reconfigures SPS again. The base station device 130 reconfigures SPS-Config so that the reception timing at which the terminal device 110 receives the video data matches the display timing of the first video.

In a case where the absolute value of the difference between the reception timing at which the video data is received and the display timing of the first video becomes larger than or equal to the predetermined threshold value, the terminal device 110 receives the video data at reception timing that has been modified on the basis of the reconfigured SPS-Config.

Figure 14:
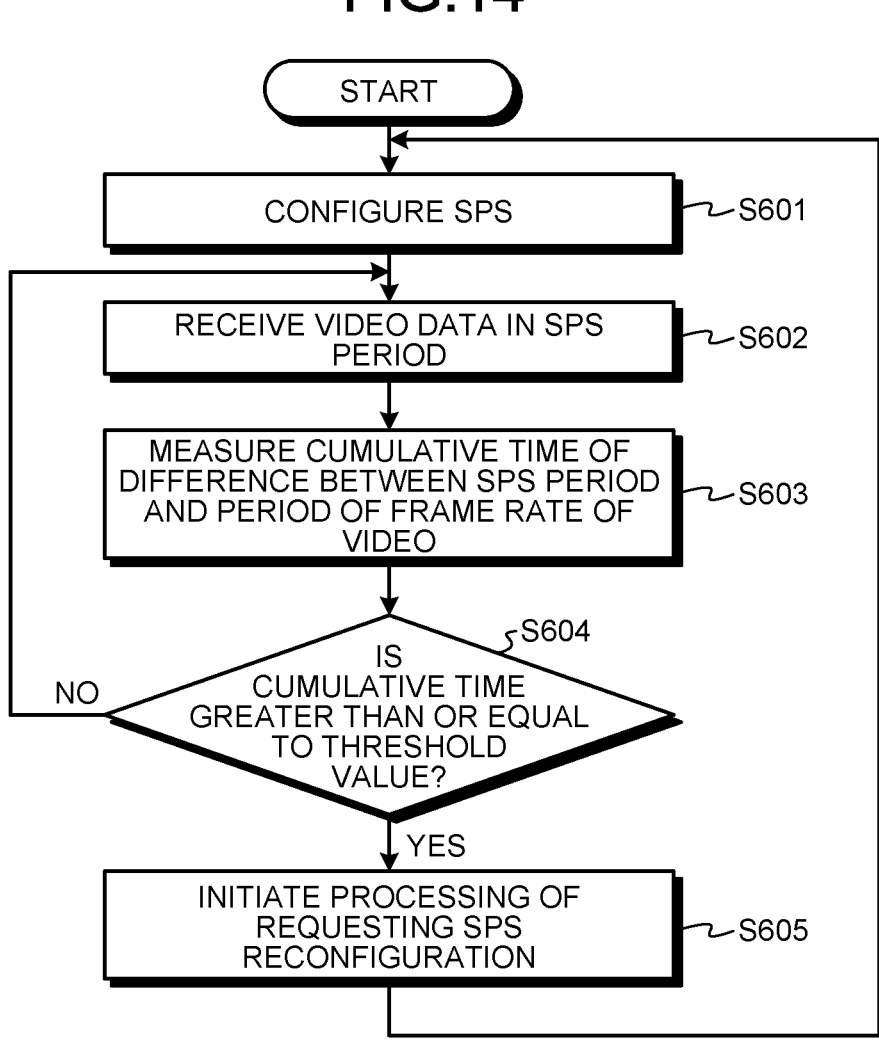
FIG. 14 is a flowchart illustrating a flow of SPS reconfiguration processing according to the embodiment of the disclosure.

FIG. 14 is a flowchart illustrating a flow of SPS reconfiguration processing according to the embodiment of the disclosure. In FIG. 14, a case where the terminal device 110 performs the SPS reconfiguration processing is illustrated.

The terminal device 110 configures SPS on the basis of a notification (for example, an RRC message including SPS-Config) from the base station device 130 (step 601). The terminal device 110 receives video data from the base station device 130 at a set SPS period (step S602).

The terminal device 110 calculates a cumulative time of differences between the SPS period (for example, 22 ms) and the frame rate of the video data (for example, the first frame rate, 22.22 ms) (step S603). More specifically, every time the video data is received, the terminal device 110 accumulates the difference (0.22 ms) between the SPS period and the first frame rate and calculates the difference from the display timing at the reception timing at which the video data is received.

Note that the terminal device 110 may calculate the difference between the reception timing and the display timing by calculating the difference between the time when the video data is received and the time when the video data is displayed.

The terminal device 110 determines whether or not the measured cumulative time is greater than or equal to a predetermined threshold value set in advance (step S604). If the cumulative time is less than the threshold value (step S604; No), the process returns to step S602, and the terminal device 110 receives the video data in the SPS period.

On the other hand, if the cumulative time is greater than or equal to the threshold value (step S604; Yes), the terminal device 110 initiates processing of requesting the base station device 130 to reconfigure SPS (step S605) and returns to step S601.

In step S605, the terminal device 110 may include, as an offset value, the cumulative time to be corrected or the number of slots corresponding to the cumulative time to be corrected in the SPS reconfiguration request (SPS-Config reset) and report the offset value.

After receiving the request for resetting SPS-Config from the terminal device 110 terminal device 110, the base station device 130 reconfigures SPS on the basis of the reported information regarding the cumulative time to be corrected. Note that the request for resetting SPS-Config is made via an RRC message.

The terminal device 110 performs the SPS reconfiguration processing while receiving the video data.

Note that, here, the terminal device 110 requests reconfiguration of SPS, however, it is not limited thereto (that is, the request for SPS reconfiguration by the terminal device 110 may not be essential). For example, the base station device 130 may calculate a difference from the display timing at the reception timing at which the video data is received and determine whether or not to reconfigure SPS. In this case, the base station device 130 acquires information regarding the frame rate of the video data from the information processing device 150, for example. Furthermore or alternatively, the base station device 130 may acquire the information regarding the frame rate of the video data from the UDR or an NF of the 5GC/NGC 20. Furthermore or alternatively, the base station device 130 may acquire information of an upper layer that is not originally terminated (that is, the information regarding the frame rate of the video data) by reading the information using deep packet inspection (DPI) or the like.

Alternatively, SPS may be reconfigured for the base station device 130 on the basis of a difference from the display timing at the reception timing at which an NF of the 5GC/NGC 20 receives the video data. Here, a case where the SMF 206 instructs the base station device 130 on the timing of reconfiguring SPS will be described.

In this case, the terminal device 110 includes, in addition to the S-NSSAI1, the absolute value of the cumulative time of the differences between the SPS period and the period of the frame rate of the video, which is allowable by the terminal device 110, in the PDU session establishment request message (see step S401 in FIG. 10) transmitted in order to receive the services corresponding to the S-NSSAI1.

The SMF 206 acquires the cumulative time allowable by the terminal device 110 from the AMF 209 and the S-NSSAI1 via Nsmf_PDUSession_CreateSMContext Request (see step S401 in FIG. 10).

Note that, although the terminal device 110 notifies the allowable cumulative time in this example, it is not limited thereto. For example, the SMF 206 may set a value predetermined on the basis of the motion-to-photon latency or the like as the allowable cumulative time.

The SMF 206 acquires information regarding the format including the frame rate of the video handled by the services corresponding to the S-NSSAI1 from the UDR.

The SMF 206 determines the SPS period on the basis of the frame rate of the video and determines a period of time in which SPS is configured on the basis of the allowable cumulative time. Here, the period of time in which SPS is configured is a period from when SPS is configured until SPS needs to be reconfigured.

The AMF 209 acquires the SPS period and the period of time for which SPS is configured from the SMF 206 via the N2 SM information in Namf_Communication_N1N2- MessageTransfer (see step S411 in FIG. 10).

The AMF 209 notifies the base station device 130 of the SPS period and the period of time for which SPS is configured that are acquired from the SMF 206, and the number of slots corresponding to the cumulative time to be corrected as an offset value via the N2 PDU session request message (see step S412 in FIG. 10).

The base station device 130 sets the SPS period in the downlink with the terminal device 110 on the basis of the SPS period and the period of time for which SPS is configured which are acquired from the AMF 209 and activates a timer in which the period of time for which SPS is configured is set.

When the timer expires, the base station device 130 reconfigures SPS in which the slot for starting SPS is offset by the number of slots corresponding to the offset value and resets the timer.

Thereafter, the SPS reconfiguration processing is repeated until the terminal device 110 ends the services corresponding to the S-NSSAI1.

<4.2. Configuring Plurality of SPSs>

In the above example, the case where the base station device 130 configures one SPS has been described, however, the base station device 130 may configure a plurality of SPSs. As a result, the base station device 130 can increase resources to be allocated to SPS.

Figure 15:
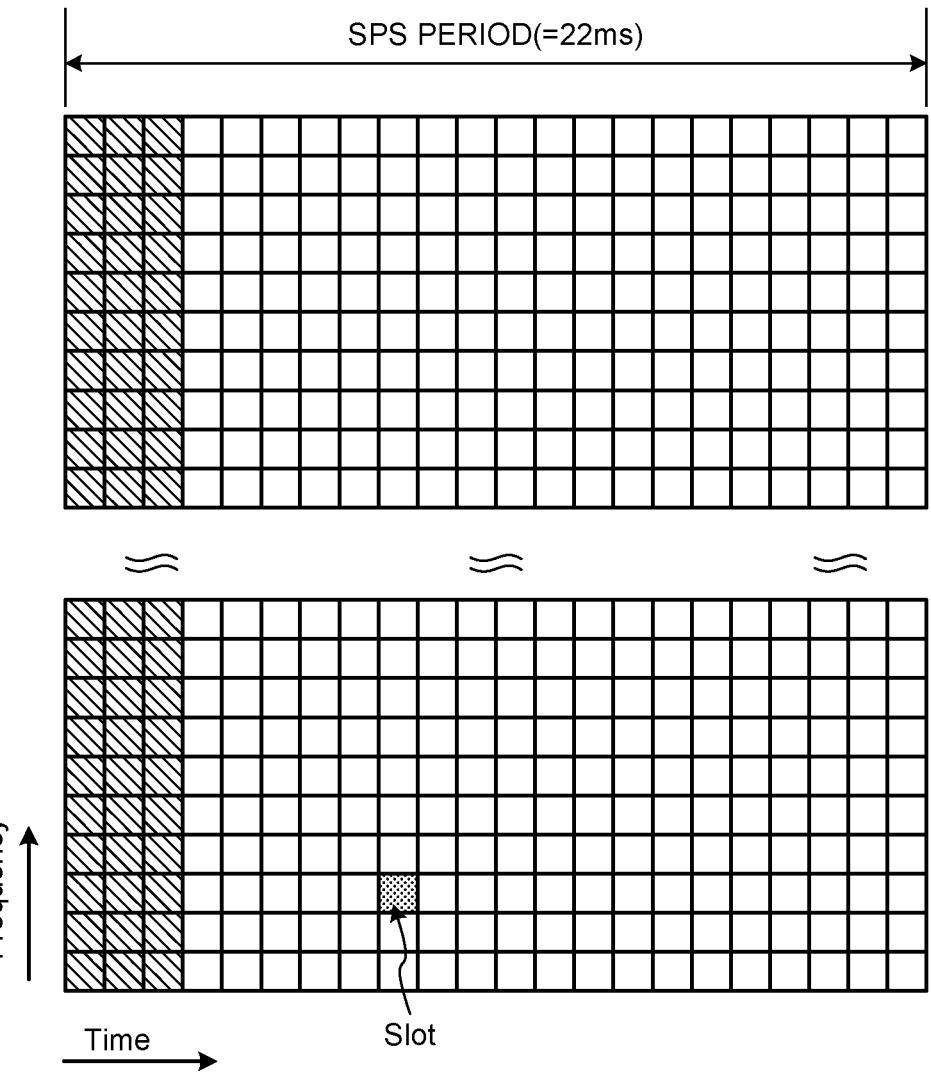
FIG. 15 is a diagram for describing an example of SPS configuration by the base station device according to the embodiment of the disclosure.
Figure 16:
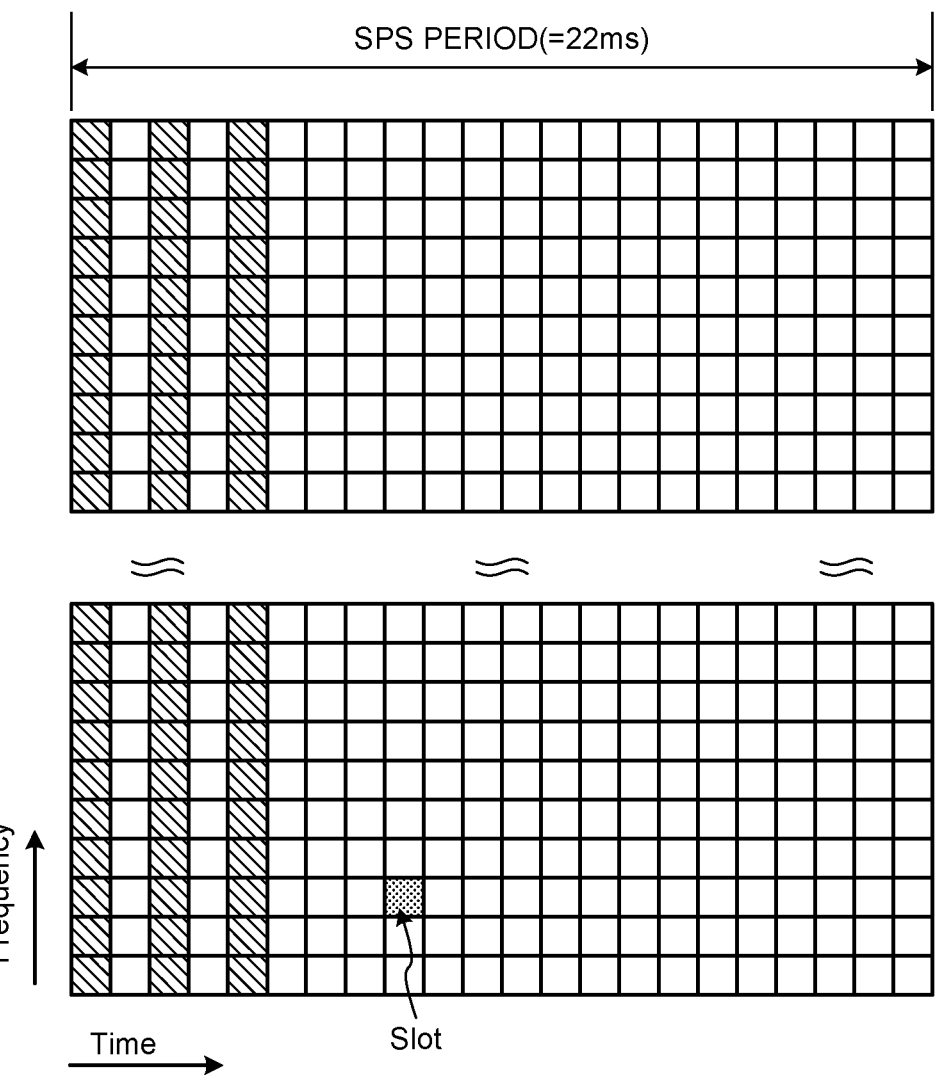
FIG. 16 is a diagram for describing an example of SPS configuration by the base station device according to the embodiment of the disclosure.

FIGS. 15 and 16 are diagrams for describing an example of SPS configuration by the base station device 130 according to the embodiment of the disclosure.

As illustrated in FIG. 15, the base station device 130 may configure a plurality of SPSs in a plurality of consecutive slots within an SPS period (for example, 22 ms). Alternatively, as illustrated in FIG. 16, the base station device 130 may configure a plurality of SPSs in a plurality of distributed slots.

The base station device 130 allocates video data to, for example, a plurality of slots to which SPS is configured and transmits the video data.

Furthermore, the base station device 130 may implement reconfiguration of SPS by switching among a plurality of SPSs.

Note that, in FIGS. 15 and 16, the base station device 130 sets SPS to a plurality of slots from the head of the SPS period, however, it is not limited thereto. The base station device 130 may set SPS to a plurality of slots from the end of an SPS period or may set SPS to a plurality of slots located at the center of an SPS period. In addition, in FIGS. 15 and 16, the number of resource allocations for which the base station device 130 configures SPS is three, however, the number is not limited thereto and may be two or greater than or equal to four.

In addition, the base station device 130 configures intermittent reception, discontinuous reception (DRX), in the terminal device 110 in order to periodically monitor the PDCCH. One of pieces of the processing performed by the terminal device 110 in the idle mode is to monitor the PDCCH that notifies paging from the base station device 130. Therefore, in the idle mode, the DRX for periodically monitoring the PDCCH is configured in order to suppress the power consumption at the time of standby.

It is also important to reduce power consumption in the terminal device 110 in a connected mode. Therefore, the base station device 130 can configure connected mode DRX (C-DRX) by using RRC connection setup or RRC ConnectionReconfiguration. The value of longDRX-Cycle is set in accordance with the PDCCH monitoring period, and values of drxStartOffset and onDurationTimer are set on the basis of the slot position to which the PDCCH is allocated. Furthermore, scheduling information is received via the PDCCH, and drx-InactivityTimer is set as a period of time for receiving data indicated by the scheduling information. Further, the base station device 130 can set Short DRX in addition to this Long DRX.

Short DRX is set by drxShortCycleTimer and shortDRX-Cycle. The terminal device 110 in the connected mode monitors the PDCCH in accordance with the configuration of the Long DRX. When the PDCCH including scheduling information is successfully demodulated over the period of time in which the onDurationTimer is valid, drx-InactivityTimer is started, and data indicated by the scheduling information can be received over the period of time in which the drx-InactivityTimer is valid. When the expiration date of the drx-InactivityTimer expires, the terminal device 110 starts drxShortCycleTimer and monitors the PDCCH with a period of shortDRX-Cycle having a frequency higher than that of longDRX-Cycle over a period of time during which the drxShortCycleTimer is valid. By monitoring the PDCCH in the shortDRX-Cycle, for example, the QoS of packets transmitted in a short period of time can be secured. When the expiration date of the drxShortCycleTimer expires, the terminal device 110 resumes periodic monitoring of the PDCCH in accordance with the configuration of Long DRX.

The base station device 130 configures the C-DRX in the terminal device 110 on the basis of the monitoring period of the PDCCH and the SPS period. For example, in a case where the PDCCH is notified within the slots to which SPS is configured, one Long DRX is configured. The value of longDRX-Cycle is set in accordance with the SPS period, and values of drxStartOffset and onDurationTimer are set on the basis of the slot position in which SPS is configured. Here, in a case where SPS is configured in a plurality of consecutive slots (FIG. 15), the value of onDurationTimer is set in accordance with the number of consecutive slots. Alternatively, the values of drxStartOffset and onDuration-Timer of Long DRX are set in accordance with the heading slot position in which SPS is configured, and the value of drx-InactivityTimer is set in accordance with the positions of second and subsequent slots. In a case where SPS is configured in a plurality of distributed slots (FIG. 16), the value of onDurationTimer is set so that all of the plurality of distributed slots are included. Alternatively, in a case where SPS is configured in a plurality of distributed slots, the values of drxStartOffset and onDurationTimer of Long DRX are set in accordance with the first slot position where SPS is configured, and drxShortCycleTimer and shortDRX-Cycle of Short DRX are set in accordance with the positions of the second and subsequent slots. The value of drxShort-CycleTimer is set on the basis of a period of slots set in a distributed manner within the SPS period, and shortDRX-Cycle is set on the basis of a period of time containing a plurality of slots set in a distributed manner.

In addition, in a case where the PDCCH is notified by a slot adjacent to a slot in which SPS is configured, the value of longDRX-Cycle is set in accordance with the SPS period, and the values of drxStartOffset and onDurationTimer are set on the basis of the positions of the adjacent slot and the slot in which SPS is configured. That is, over the period of time of the onDurationTimer, data transmitted by using the slots in which the PDCCH monitoring and SPS are config-ured is received.

Note that the configuration of one Long DRX is recon-figured at the timing when SPS is reconfigured. In a case where reconfiguration of SPS is implemented by switching among a plurality of SPSs, Long DRX is reconfigured every time SPS is switched. The values of drxStartOffset, onDu-rationTimer, or drx-InactivityTimer are reset on the basis of the slot position of SPS switched to. In order to update each parameter of the DRX in the DRX reconfiguration, each parameter may be notified via the DCI.

In addition, two independent Long DRXs may be con-figured in order to set the PDCCH monitoring period and the SPS period flexibly, that is, to set different periods. A first Long DRX is configured for the PDCCH monitoring, and a second Long DRX is configured for data reception via SPS. The value of a first longDRX-Cycle is set in accordance with the monitoring period of the PDCCH, and values of a first drxStartOffset and a first onDurationTimer are set on the basis of the slot that notifies the PDCCH. The value of a second longDRX-Cycle is set in accordance with the SPS period, and values of a second drxStartOffset and a second onDurationTimer are set on the basis of the slot position in which SPS is configured. Note that, for configuring the second Long DRX, the method described above for the case of configuring one Long DRX can be used. Incidentally, in a case where a part or all of the period of time of the first onDurationTimer and the period of time of the second onDurationTimer overlap, the terminal device 110 deter-mines a period of time obtained as a logical sum (OR) of the period of time of the first onDurationTimer and the period of time of the second onDurationTimer as the period of time of the onDurationTimer. Furthermore, in a case where the period of time from the end timing of the first onDuration-Timer to the start of the second onDurationTimer or the period of time from the end timing of the second onDura-tionTimer to the start of the first onDurationTimer is less than or equal to a certain threshold value, it is conceivable that it becomes difficult to control on and off of a reception system of the terminal device 110. In such a case, the terminal device 110 can avoid the problem of on-off control of the reception system by setting a consecutive period of time including the periods of time of the first onDuration-Timer and the second onDurationTimer as a period of time of a third onDurationTimer. In addition, the threshold value (for example, five slots or the like) for this determination may be notified to the terminal device 110 as one of parameters of the Long DRX (for example, DurationThresh-old) when the second Long DRX is configured. Note that the above-described concept of slots in SPS or DRX configu-ration may include a mini-slot.

Figure 17:
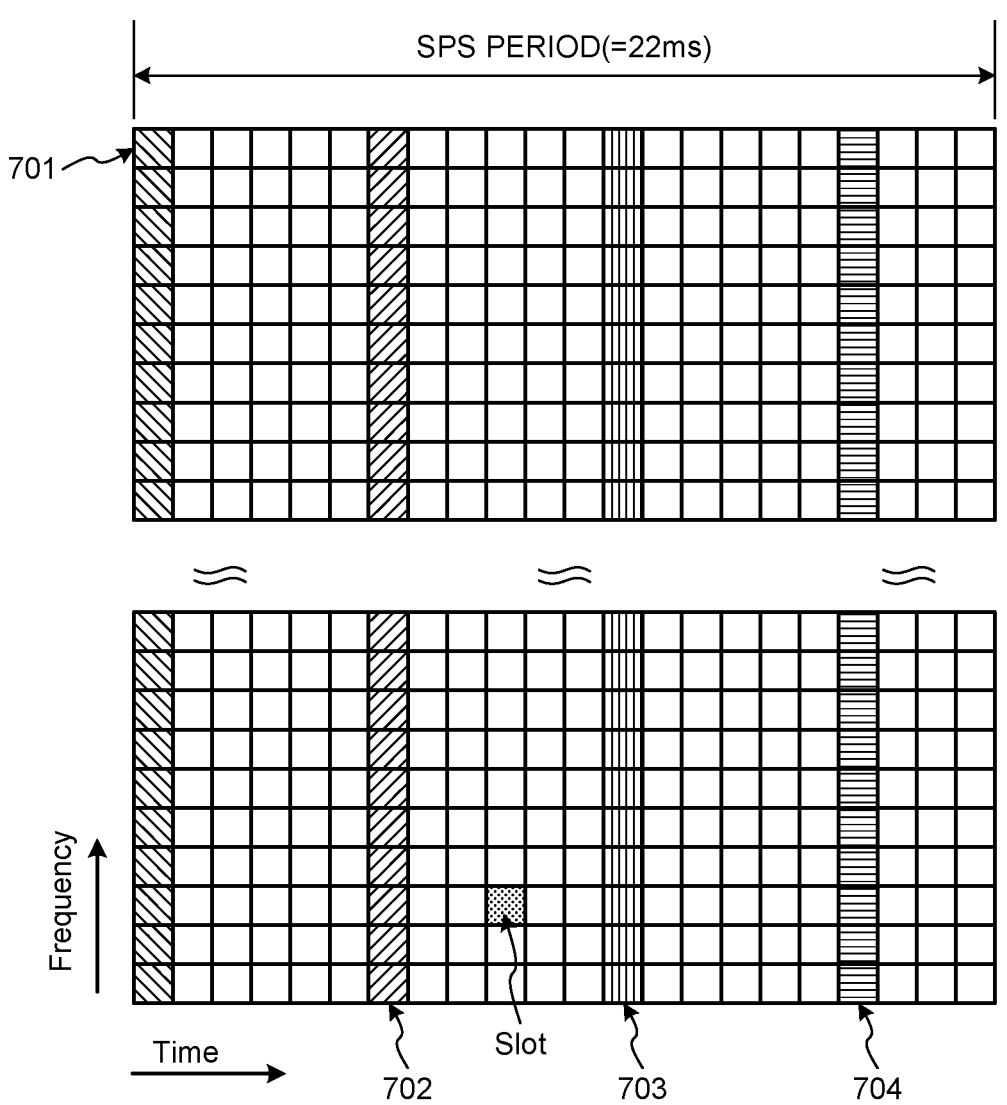
FIG. 17 is a diagram for describing an example of SPS configuration by the base station device according to the embodiment of the disclosure.

FIG. 17 is a diagram for describing an example of SPS configuration by the base station device 130 according to the embodiment of the disclosure.

In FIG. 17, the base station device 130 configures a plurality of SPSs having the same period within the SPS period (for example, 22 ms).

The base station device 130 sets, for example, resource allocations 701 to 704 corresponding to four SPSs having a desired slot interval in the downlink with the terminal device 110. In FIG. 17, six slots are available between the resource allocations 701 and 702, between the resource allocations 702 and 703, and between the resource allocations 703 and 704. Furthermore, there is a gap of 4 slots between the resource allocation 704 and a resource allocation 701 of a next period.

The base station device 130 can separately activate each of the plurality of configured resource allocations by using the downlink control information (DCI). Here, for example, the base station device 130 first activates only SPS corre-sponding to the resource allocation 701.

Let us presume that a cumulative time of differences between the SPS period and the period of the first frame rate of the video reaches a time difference between the resource allocation 701 and the resource allocation 702, that is, more than or equal to six slots in the example of FIG. 17. In this case, the base station device 130 deactivates SPS corre-sponding to the resource allocation 701 by using the DCI and activates SPS corresponding to the resource allocation 702.

Next, let us presume that a cumulative time of differences between the SPS period and the period of the first frame rate of the video again reaches a time difference between the resource allocation 702 and the resource allocation 703, that is, more than or equal to six slots. In this case, the base station device 130 deactivates SPS corresponding to the resource allocation 702 by using the DCI and activates SPS corresponding to the resource allocation 703.

Subsequently, let us presume that a cumulative time of differences between the SPS period and the period of the first frame rate of the video reaches a time difference between the resource allocation 703 and the resource allocation 704, that is, more than or equal to six slots. In this case, the base station device 130 deactivates SPS corresponding to the resource allocation 703 by using the DCI, and the base station device 130 activates SPS corresponding to the resource allocation 704.

Similarly, let us presume that a cumulative time of differences between the SPS period and the period of the first frame rate of the video reaches a time difference between the resource allocation 704 and a resource allocation 701 of a subsequent period, that is, more than or equal to four slots. In this case, the base station device 130 deactivates SPS corresponding to the resource allocation 704 by using the DCI and activates SPS corresponding to the resource allocation 701.

Thereafter, the activation and deactivation processing of each of the plurality of configured SPSs is continued until the terminal device 110 terminates the services corresponding to the S-NSSAI1.

As described above, in a case where SPS to be used for transmission of video data is switched, the base station device 130 may notify the terminal device 110 of the offset of SPS before and after the switching by using, for example, DCI.

Here, the information regarding the SPS period, the number of SPSs configured within the SPS period, the arrangement of resource allocations corresponding to the respective SPSs within the SPS period, and a period of time from activation to deactivation of each of the SPSs is notified from the SMF 206 to the base station device 130 in the PDU session establishing processing.

<4.3. Reconfiguring CG>

In applications in which a free viewpoint video or a real-time video is viewed on an HMD, such as AR, VR, MR, SR, or XR, it is important to suppress the motion-to-photon latency within a certain value as described above. Therefore, in order to reflect the head motion, the viewpoint, or a change in the field of view including the viewpoint in each frame image of a video, periodic uplink occurs in which the most recent information related to the inertia detected by the terminal device 110 is transmitted. Therefore, when the terminal device 110 sends a PDU session establishment request for receiving services corresponding to the S-NS-SAI1 to the AMF 209, the 5GC configures a configured grant (CG) in addition to SPS described above. Incidentally, as the method of configuring a CG, the same method as the method of configuring SPS described above can be used.

In addition, in the PDU session establishing processing for the services corresponding to the S-NSSAI1, the selected SMF 206 may use the AF 208 for provision of the services corresponding to the S-NSSAI1.

For example, in a case where the application used by the terminal device 110 requires periodic downlink reception, the AF 208 determines the SPS configuration. Furthermore, in a case where the application involves reception of a video, the AF 208 specifies the format of the video and determines a necessary SPS configuration depending on the specified video format.

Furthermore, in a case where the application used by the terminal device 110 requires periodic uplink transmission, the AF 208 may determine the CG configuration. For example, in order to reflect the information regarding the inertia detected by the terminal device 110 in the video received by the application, a CG configuration in consideration of the frame rate of the video is determined. That is, the AF 208 provides, to another NF or the base station device 130, information for assisting the configuration necessary for reception of video data and the configuration necessary for transmission of information (for example, the information regarding the inertia) used for generation of the video data on the basis of the format of the video handled by the application.

The SPS configuration and the CG configuration determined by the AF 208 are provided to the base station device 130 via the SMF 206 and the AMF 209.

Here, in the above-described example, the case where the base station device 130 performs the reconfiguration of SPS has been described, however, the base station device 130 may reconfigure ConfiguredGrantConfig (CGConfig). This point will be described by referring to FIGS. 18 and 19.

Figure 18:
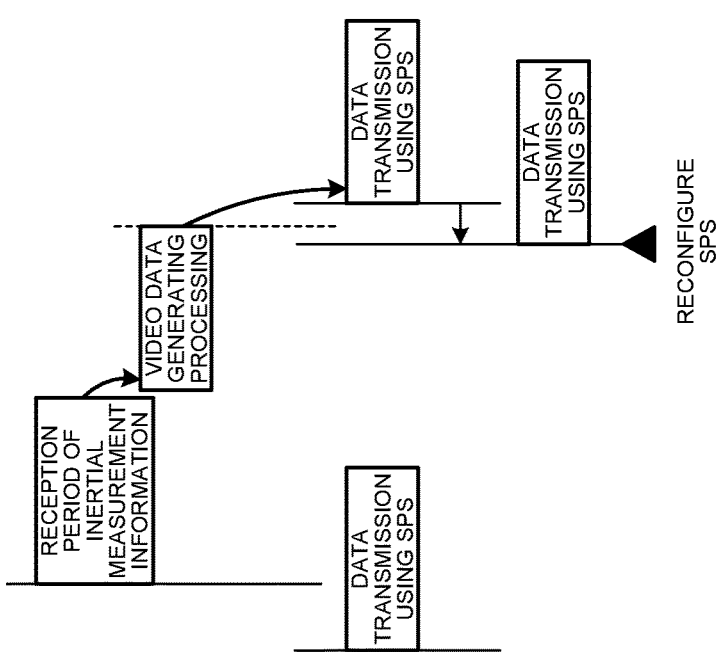
FIG. 18 is a diagram for describing CG reconfiguration by the base station device according to the embodiment of the disclosure.
Figure 19:
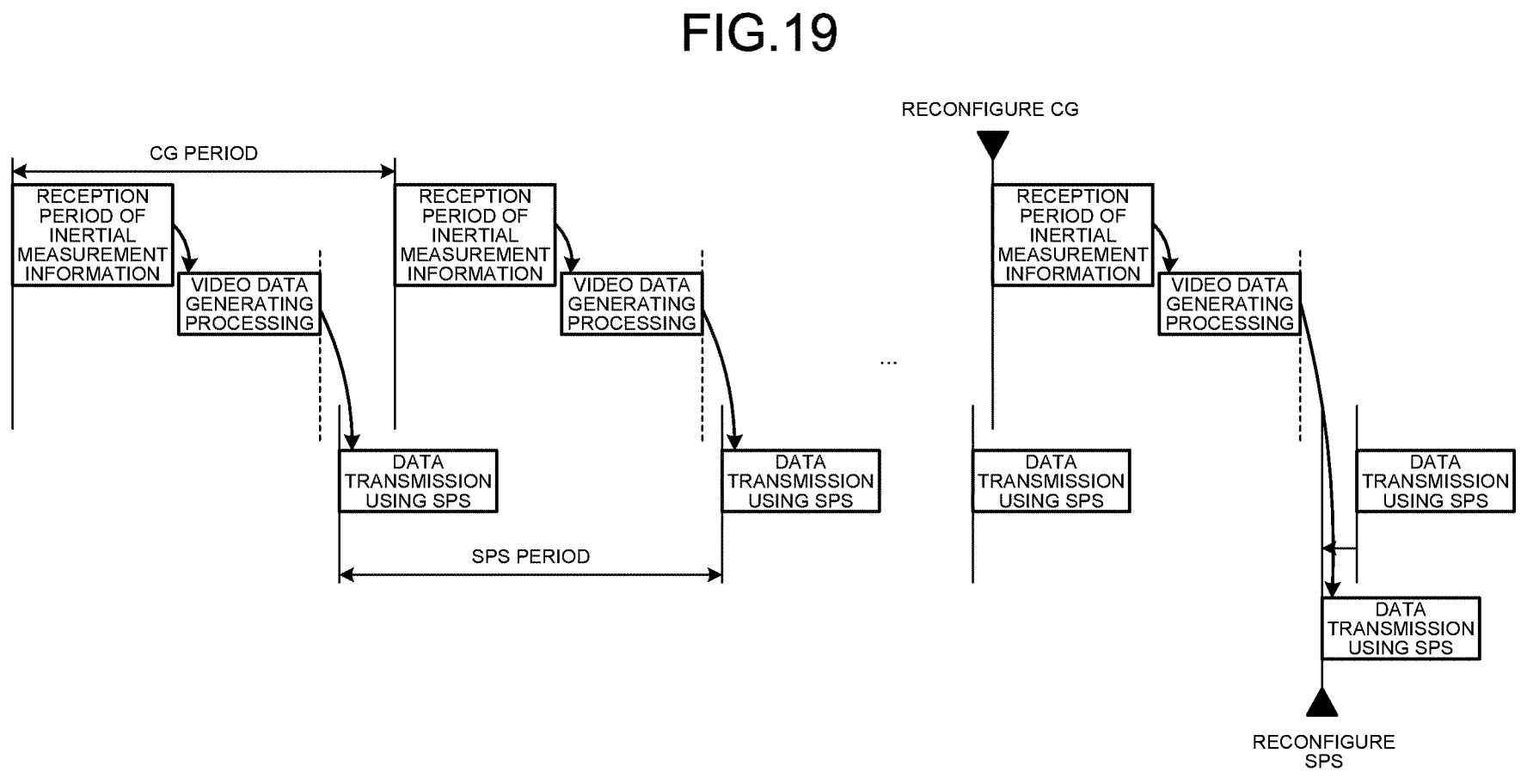

FIGS. 18 and 19 are diagrams for describing CG reconfiguration by the base station device 130 according to the embodiment of the disclosure.

As illustrated in FIG. 18, the information processing device 150 periodically receives the inertial measurement information via the base station device 130 during a reception period of the inertial measurement information. The period at this point is determined by the period of uplink communication in which the base station device 130 receives the inertial measurement information from the terminal device 110 and coincides with, for example, the CG period set in ConfiguredGrantConfig.

The information processing device 150 executes video data generating processing on the basis of the received inertial measurement information to generate video data and transmits the video data to the terminal device 110 via the base station device 130. Such video data is transmitted in a SPS period by data transmission using SPS.

In a case where the SPS period and the CG period are the same, the information processing device 150 can generate video data on the basis of the inertial measurement information received most recently.

In this case, when a cumulative time of differences between the SPS period and the first frame rate becomes greater than or equal to a threshold value, the base station device 130 reconfigures SPS. As a result, a shift occurs in the data transmission using SPS.

In the example of FIG. 18, SPS is reconfigured so that the transmission timing of data transmission using SPS is advanced. Therefore, even when the information processing device 150 generates video data on the basis of the inertial measurement information received most recently, the video data cannot be transmitted in time for transmission timing after the reconfiguration. Alternatively, in order to transmit the video data, the information processing device 150 needs to generate the video data using inertial measurement information that has been received before the one received most recently.

Therefore, as illustrated in FIG. 19, the base station device 130 according to the present embodiment performs reconfiguration of ConfiguredGrant (CG) in a case where SPS is reconfigured. At this point, the base station device 130 desirably reconfigures the CG before the timing at which SPS is reconfigured. As a result, even when SPS is reconfigured, the information processing device 150 can generate video data on the basis of the most recent inertial measurement information received most recently.

<4.4. Modifying Timewarp>

In the example described above, the base station device 130 reconfigures SPS or a CG to reduce the shift between the communication timing and the display timing generated in the terminal device 110, however, the method of reducing the shift is not limited thereto. For example, the terminal device 110 may reduce the shift by adjusting the number of timewarp images to be displayed using timewarp.

Figure 20:
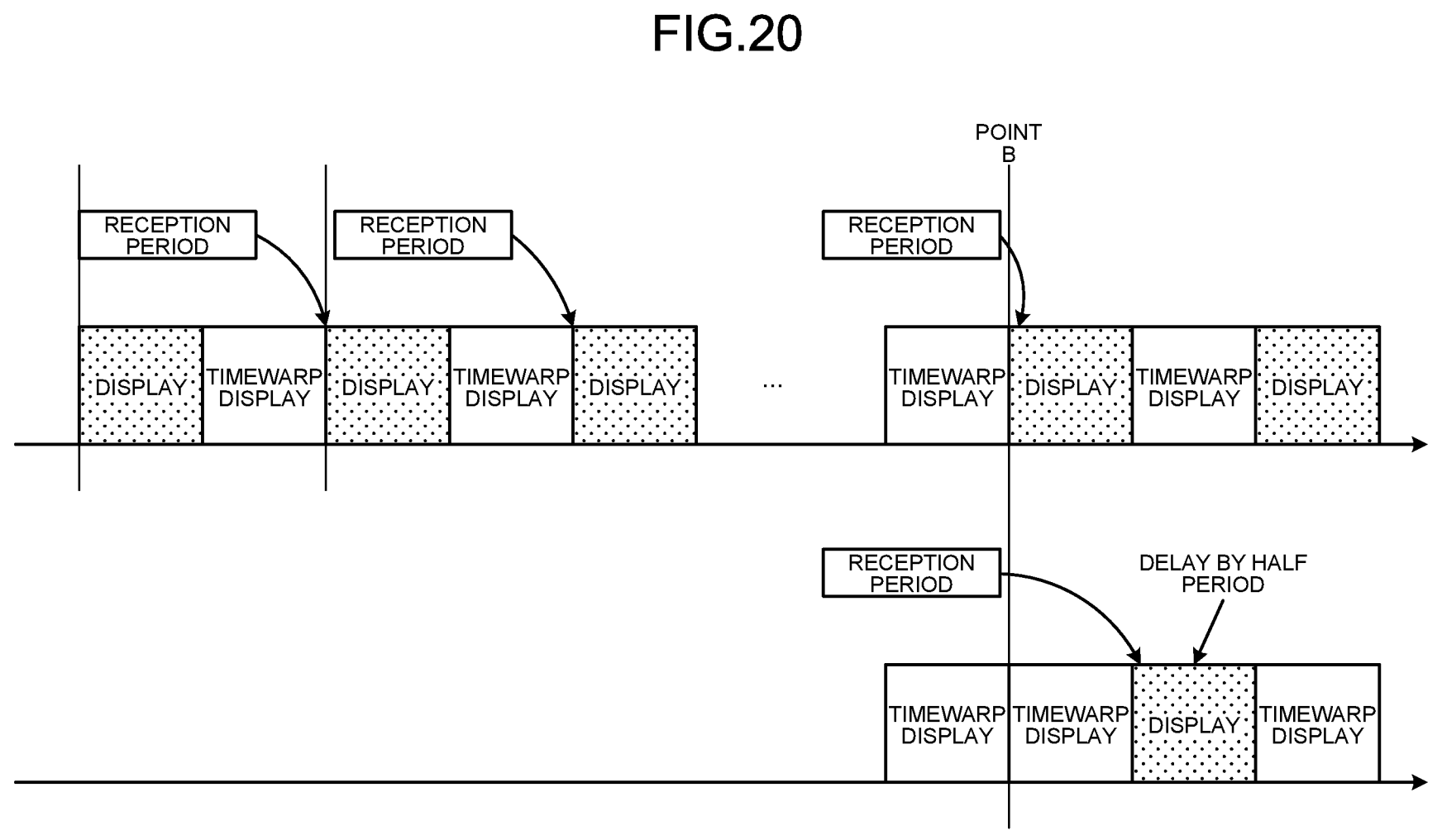

FIG. 20 is a diagram for describing an example of display processing by the terminal device 110 according to the embodiment of the disclosure.

As illustrated in FIG. 20, the terminal device 110 generates and displays a frame image (hereinafter, also referred to as a first image) from the video data received in a reception period of the SPS period by using the most recent information regarding the inertia. Furthermore, the terminal device 110 timewarp-displays a frame image (timewarp image) generated in a similar manner. The terminal device 110 displays the first image or the timewarp image as a frame image at the second frame rate.

In this case, a state in which the reception of the video data is not in time for the display timing of the first image occurs due to accumulation of a slight difference between the SPS period and the first frame rate (45 fps) period. In FIG. 20, the state in which the reception of the video data is not in time for the display timing of the first image occurs at point B.

Let us presume that a cumulative time of the difference between the SPS period and the period of the first frame rate becomes greater than or equal to a certain threshold value and that it is not in time for the display timing of the first image. As illustrated in the lower diagram of FIG. 20, the terminal device 110 displays a timewarp image obtained by applying timewarp to video data received at preceding reception timing at timing at which the first image is to be originally displayed. As a result, the terminal device 110 can delay the display timing of the first image by a half the period and can display the first image generated using the video data received most recently.

In the above example, the case where the reception timing of the video data is delayed and it is not in time for the display timing of the first image has been described, however, a case where the reception timing of the video data is advanced will be described.

Figure 21:
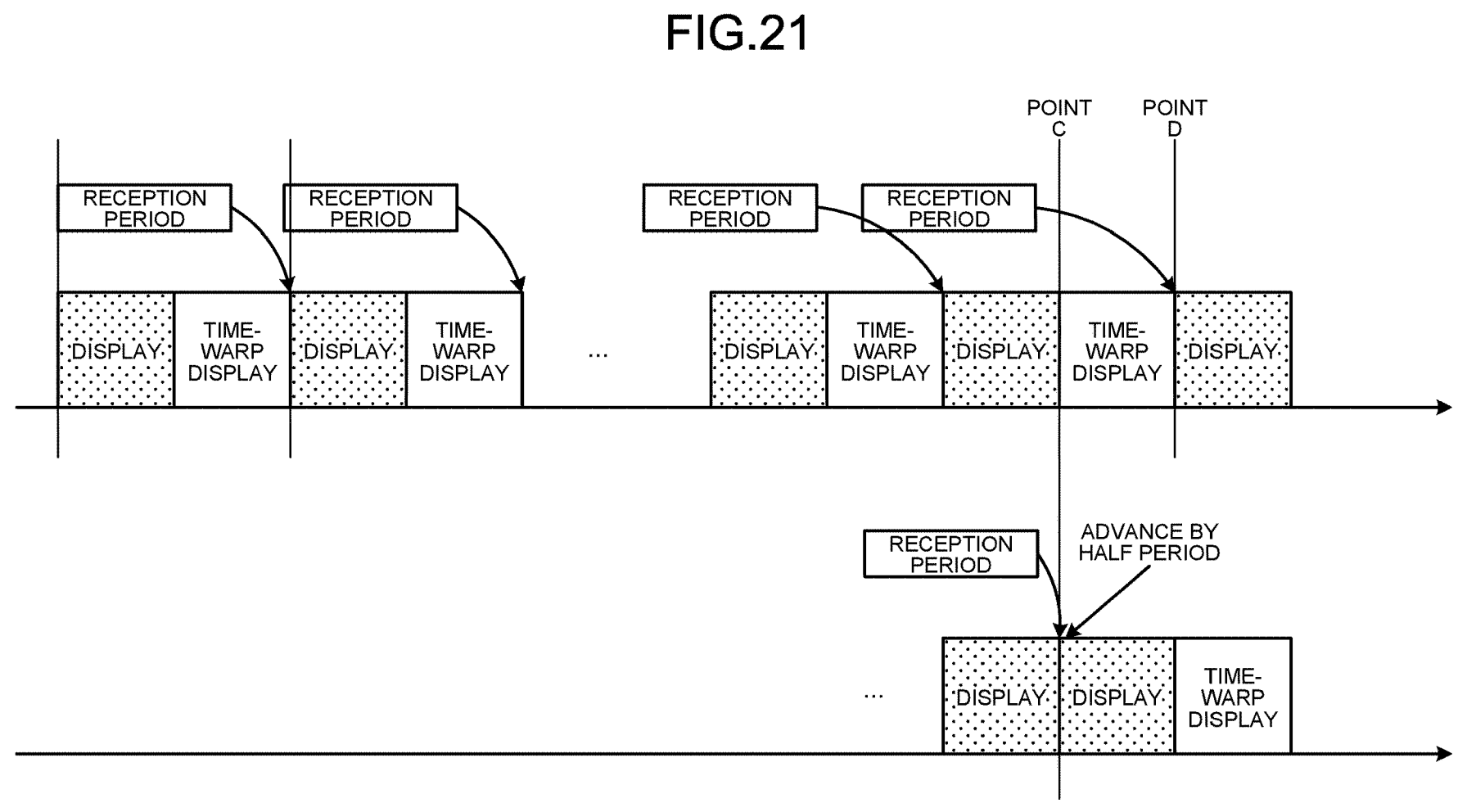

FIG. 21 is a diagram for describing another example of the display processing by the terminal device 110 according to the embodiment of the disclosure.

With accumulation of a slight shift between the SPS period and the first frame rate (45 fps) period, a state occurs in which a delay from reception of the video data to display timing of displaying the first image generated on the basis of the video data becomes large. In FIG. 21, at point D, a delay from reception of the video data to the display timing of displaying the first image is too large, for example, for the motion-to-photon latency to be ignored.

Let us presume that, in this manner, the cumulative time of the difference between the SPS period and the period of the first frame rate has become greater than or equal to the certain threshold value and that a delay from reception of the video data to the display timing of displaying the first image has become too large for the motion-to-photon latency to be ignored.

As illustrated in the lower diagram of FIG. 21, the terminal device 110 displays the first image generated from the video data received most recently, at timing (point C) for displaying a timewarp image acquired by applying timewarp to the video data received at previous reception timing. As a result, the terminal device 110 can advance the display timing of the first image by the half the period and can reduce the influence of the motion-to-photon latency.

<4.5. Setting Priorities>

In some examples described above, the case where one piece of video data is allocated to one SPS has been described, however, it is not limited thereto. For example, the base station device 130 may allocate the video data divided into a plurality of areas to a plurality of SPSs depending on the priority of each of the areas. Incidentally, each of the divided pieces of video data is, for example, data called a segment.

FIGS. 22 to 25 are diagrams for describing examples of video data allocation processing by the base station device 130 according to the embodiment of the disclosure.

The information processing device 150 sets a viewpoint of a user or a field of view including the viewpoint on the basis of the most recent information regarding the inertia acquired from the terminal device 110. Furthermore, the information processing device 150 determines an area so that the set viewpoint or the field of view is set at the center and generates video data of the determined area.

Figures 22, 23:
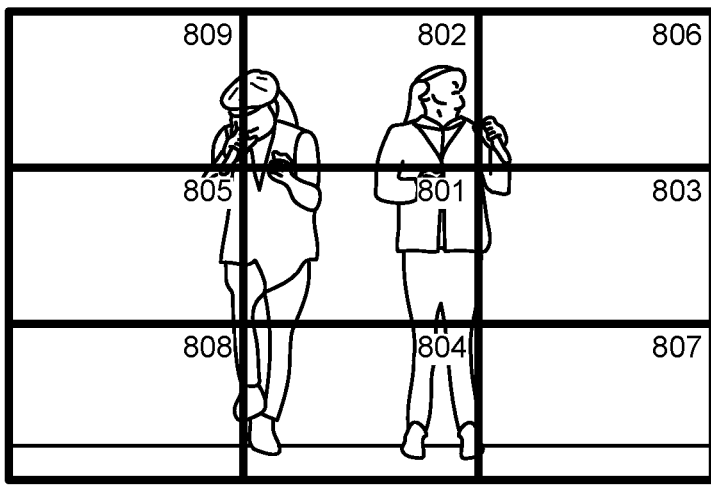
FIG. 22 is a diagram for describing an example of video data allocation processing by the base station device according to the embodiment of the disclosure.
FIG. 23 is a diagram for describing an example of the video data allocation processing by the base station device according to the embodiment of the disclosure.

At this point, as illustrated in FIG. 22, the information processing device 150 divides the generated video data into a plurality of areas. Then, the information processing device 150 modifies the resolution of the divided areas depending on the distance between the set viewpoint of the user and a divided area.

For example, as illustrated in FIG. 22, the information processing device 150 generates video data on the premise that the viewpoint of the user is located at the center of the video data and divides the generated video data into nine areas of 3×3.

In this case, as illustrated in FIG. 23, the information processing device 150 sets the resolution of a central area 801 closest to the viewpoint among the divided areas to be the highest (high resolution). Meanwhile, the information processing device 150 sets the resolution of areas 806 to 809 farthest from the viewpoint among the divided areas and located at the corners of the video data to be the lowest (low resolution). The information processing device 150 sets the resolution of the remaining areas 802 to 805 to an intermediate resolution between the high resolution and the low resolution (intermediate resolution). The areas 802 to 805 are in contact with the area 801 closest to the viewpoint at a side thereof, and the areas 806 to 809 are in contact with the areas 802 to 805 at sides thereof.

Note that, although the case where the video data is divided into nine pieces has been described here, the number of divisions of the image data is not limited to nine. The number of divisions may be in a range of 2 to 8 or greater than or equal to 10. Furthermore, the case where the resolution of an area is classified into three of low, intermediate, and high has been described; however, the number of resolutions is not limited to three. The number of resolutions may be two or greater than or equal to four. Furthermore, the case where the sizes of respective divided areas are the same has been described here, however, it is not limited to the example where the sizes of respective areas are the same. For example, the areas may be divided into areas of different sizes.

Here, a plurality of formats having different resolutions may be defined in advance as video data that can be applied to each area. That is, the information processing device 150 generates video data by selecting a video format having a different resolution depending on the distance from the viewpoint.

The information processing device 150 may further select a video format having a different resolution on the basis of the communication quality between the terminal device 110 and the base station device 130 in addition to the distance from the viewpoint. For example, the AF 208 includes a wireless communication quality acquiring unit (not illustrated) and acquires the communication quality between the terminal device 110 and the base station device 130 from the base station device 130. The wireless communication quality acquiring unit provides the information processing device 150 with the communication quality between the terminal device 110 and the base station device 130 acquired from the base station device 130.

Figures 24, 25:
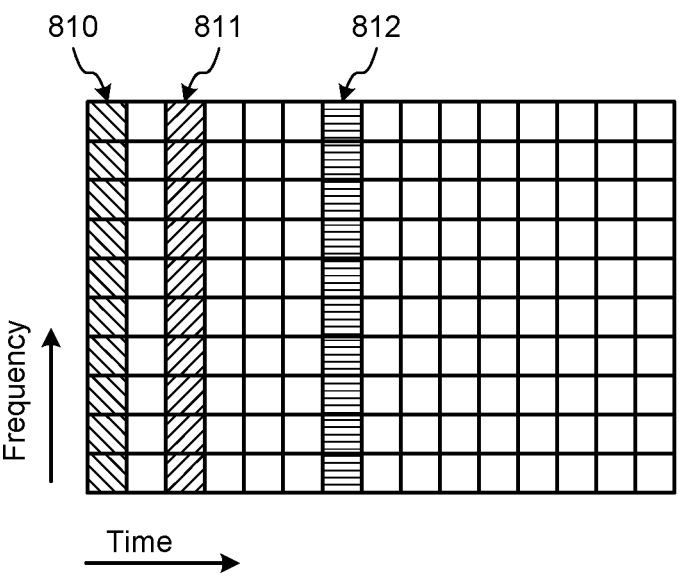
FIG. 24 is a diagram for describing an example of the video data allocation processing by the base station device according to the embodiment of the disclosure.
FIG. 25 is a diagram for describing an example of the video data allocation processing by the base station device according to the embodiment of the disclosure.

As illustrated in FIG. 24, the AF 208 assigns priority depending on the resolution of each area of the video. High priority is assigned to the high-resolution area 801, intermediate priority is assigned to the intermediate-resolution areas 802 to 805, and low priority is assigned to the low-resolution areas 806 to 809. Here, the priority is, for example, the QoS Flow Identifier (QFI) and the 5G QoS Identifier (5QI).

Incidentally, a QoS flow is a concept of a finest level that differentiates QoS within a PDU session, and in 5GS, a QoS flow is identified by a QFI. At N3 between the UPF 220 and the RAN/AN 230 corresponding to the base station device 130, each data flow is transmitted with an encapsulated QFI added to the header. Note that the QFI may be equivalent to the 5QI.

The AMF 209 determines the SPS configuration including the SPS period on the basis of the frame rate of a video in an area of each priority. At this point, the AMF 209 may set the same frame rate for videos in the areas of the respective priorities or may lower the frame rate of a video in an area with low priority.

Furthermore, the SPS configuration for each priority is determined with consideration so that a video in an area with higher priority is received by the terminal device 110 earlier in terms of time than a video in an area with lower priority.

The SPS configuration for each priority determined by the AMF 209 is provided to the base station device 130 via the SMF 206 and the AMF 209.

The base station device 130 executes the resource allocation of SPS on the basis of the SPS configuration for each priority acquired from the AMF 209.

In the example illustrated in FIG. 25, the base station device 130 sets a periodic resource allocation 810 of SPS for the high priority, a periodic resource allocation 811 of SPS for the intermediate priority, and a periodic resource allocation 812 of SPS for the low priority.

The base station device 130 identifies the priority on the basis of the QFI added to the data flow received from the UPF 220 and transmits data of each of the areas of the video data using the resource allocations corresponding to the priority. For example, the base station device 130 transmits the area 801 with the high priority to the terminal device 110 using the resource allocation 810. Similarly, the base station device 130 transmits the areas 802 to 805 with the intermediate priority to the terminal device 110 by using the resource allocation 811 and transmits the areas 806 to 809 with the low priority to the terminal device 110 by using the resource allocation 812.

Furthermore, information including mapping or formats of each of the areas necessary for the rendering unit 1153 of the terminal device 110 to restore the divided videos into one video is transmitted using the periodic resource allocation 810 for transmitting data with the high priority. Incidentally, the information including the mapping or the formats of each of the areas necessary for restoring the divided videos into one video may be, for example, Media Presentation Description (MPD) or a file of a similar purpose.

The rendering unit 1153 can restore as video data of one area by applying a decoding method suitable for a format of each of the divided areas on the basis of the information including the mapping or the formats of the areas.

The rendering unit 1153 sets the timing of a frame of the video to be displayed (for example, see point B1 in FIG. 12) on the basis of the timing (for example, see point A in FIG. 12) set by SPS that has first received data via the periodic resource allocation 810. For example, a period of time required for decoding, a period of time required for rendering processing, and an offset period with consideration to a margin is applied to the timing of the frame of the video. This offset period is controlled by the video application control unit 1151.

Here, an example has been described in which the resolution of a divided area is modified depending on the distance between the viewpoint of the user and the divided area, however, only the priority may be modified without changing the resolution of each of the divided areas. The information processing device 150 sets the priority of the central area 801 closest to the viewpoint among the divided areas to be the highest (high priority). Meanwhile, the information processing device 150 sets the priority of the areas 806 to 809 farthest from the viewpoint among the divided areas and located at the corners of the video data to be the lowest (low priority). The information processing device 150 sets the priority of the remaining areas 802 to 805 to be intermediate between the high priority and the low priority (intermediate priority). Incidentally, the priority refers to, for example, a QFI and a 5QI.

In addition, when data of each of the areas is transmitted, the order of transmission may be determined on the basis of pixels. For example, even in a case where the terminal device 110 cannot receive the information of all the pixels within a predetermined period of time, the information processing device 150 preferentially transmits information of pixels at specific positions in a frame image so that a low-resolution image can be displayed. Subsequently, control is performed to transmit information of the remaining pixels. The base station device 130 transmits data of each of the areas to the terminal device 110 in accordance with the priority based on pixels. The rendering unit 1153 combines a plurality of low-resolution frame images that has been received to generate a high-resolution frame image.

5. OTHER EMBODIMENTS

Note that the above-described embodiment is an example, and various modifications and applications can be made.

In the above embodiment, the example has been described in which timewarp is applied to the video of the frame rate of 45 fps to display the video of the frame rate of 90, however, the frame rates are not limited to this example. The technology of the disclosure can be applied to display of videos of various frame rates.

In the above embodiment, the information processing device 150 generates the video data on the basis of the information regarding the inertia and transmits the video data to the terminal device 110. That is, for example, the information processing device 150 generates video data based on the viewpoint of the user from the video information of 360 degrees and transmits the video data to the terminal device 110, however, it is not limited thereto. For example, the information processing device 150 may transmit the video data of 360 degrees as it is to the terminal device 110. In this case, the information processing device 150 may reduce the amount of transmission data by transmitting, for example, video data of 360 degrees with low resolution. Furthermore, the information processing device 150 may transmit both the video data based on the viewpoint of the user and the video data of 360 degrees with reduced resolution to the terminal device 110.

Moreover, in the above embodiment, the base station device 130 or an NF of the 5GC/NGC 20 acquires the frame rate, however, it is not limited thereto. That is, the information regarding the frame rate acquired by the base station device 130 or an NF of the 5GC/NGC 20 may be not only the value of the frame rate itself (for example, 45 fps or 90 fps) but also an index (for example, QFI or 5QI) corresponding to the frame rate.

Furthermore, the example in which the mapping and the formats of the areas are included as the information for restoring the divided videos into one video has been described, however, the information regarding the frame rate may be included in the information for restoring the divided videos into one video. The base station device 130 or an NF of the 5GC/NGC 20 may acquire the frame rate via the information for restoring the divided videos into one video.

Furthermore, in the above embodiment, the case where the terminal device 110 receives the video data on the downlink and transmits the information regarding the inertia on the uplink has been described, however, it is not limited thereto. For example, data received by the terminal device 110 may be any data other than video data as long as the data is received in real time and periodically. In addition, data transmitted by the terminal device 110 may also be any data other than information regarding the inertia as long as the data is transmitted in real time and periodically. As described above, the technology of the disclosure can be applied to communication of various types of data performed in real time and periodically.

6. APPLICATION EXAMPLES

Furthermore, in the SPS or CG configuration described above in some embodiments, requirements of services (for example, a cloud game) using augmented reality (AR), virtual reality (VR), mixed reality (MR), or substitutional reality (SR) may be considered.

In the 5G New Radio (NR), several typed of services have been studied as use cases. Among them, AR/VR services are expected to be killer content of the 5G NR. 3GPP TR 22.842 v17.1.0 and TS 22.261 v17.0.1 define requirements regarding rendering of game images for cloud games using AR or VR. More specifically, these technical specifications and reports describe the motion-to-photon delay and the motion-to-sound delay as allowable delays of a level at which the AR or VR users do not feel uncomfortable with the motion of a video in the rendering of the game images, as follows:

motion-to-photon delay: motion-to-photon delay is in a range of 7 to 15 ms while a required data rate (1 Gbps) is maintained; and motion-to-sound delay: less than 20 ms.

Note that the motion-to-photon delay is defined as a delay between the physical motion of the head of a user and an updated image in an AR or VR headset (for example, a head mounted display). Meanwhile, the motion-to-sound delay is defined as a delay between the physical motion of the head of a user and an updated sound wave from a head-mounted speaker that reaches the user's ears. The AR/VR headset or the head mounted speaker in this example may be the terminal device 110 in the present disclosure.

In order to satisfy these conditions regarding the delays, the technical specification and the report above specify so that the following two requirements regarding rendering be satisfied for a 5G system.

Max allowed end-to-end latency: 5 ms (that is, the total allowable delay of uplink and downlink between a terminal (for example, terminal device 110) and an interface to a data network (for example, a network in which an application function (AF) is arranged) is 5 ms)

Service bit rate: user-experienced data rate: 0.1 Gbps (100 Mbps) (that is, a throughput capable of supporting AR or VR content).

Note that the rendering here includes cloud rendering, edge rendering, or split rendering. In cloud rendering, AR or VR data is rendered on a cloud of a network (on a certain entity based on core network (including UPF) deployment and data network (including an application server or AF) deployment in which the user location is not considered). In edge rendering, AR or VR data is rendered on an edge (a certain entity (for example, edge computing server (application server in a data network in network deployment for edge computing)) based on core network (including UPF) deployment and data network (including an application server or AF) deployment close to the location of a user) of a network. Split rendering refers to rendering in which a part of rendering is performed on a cloud and another part is performed on an edge.

Figure 26:
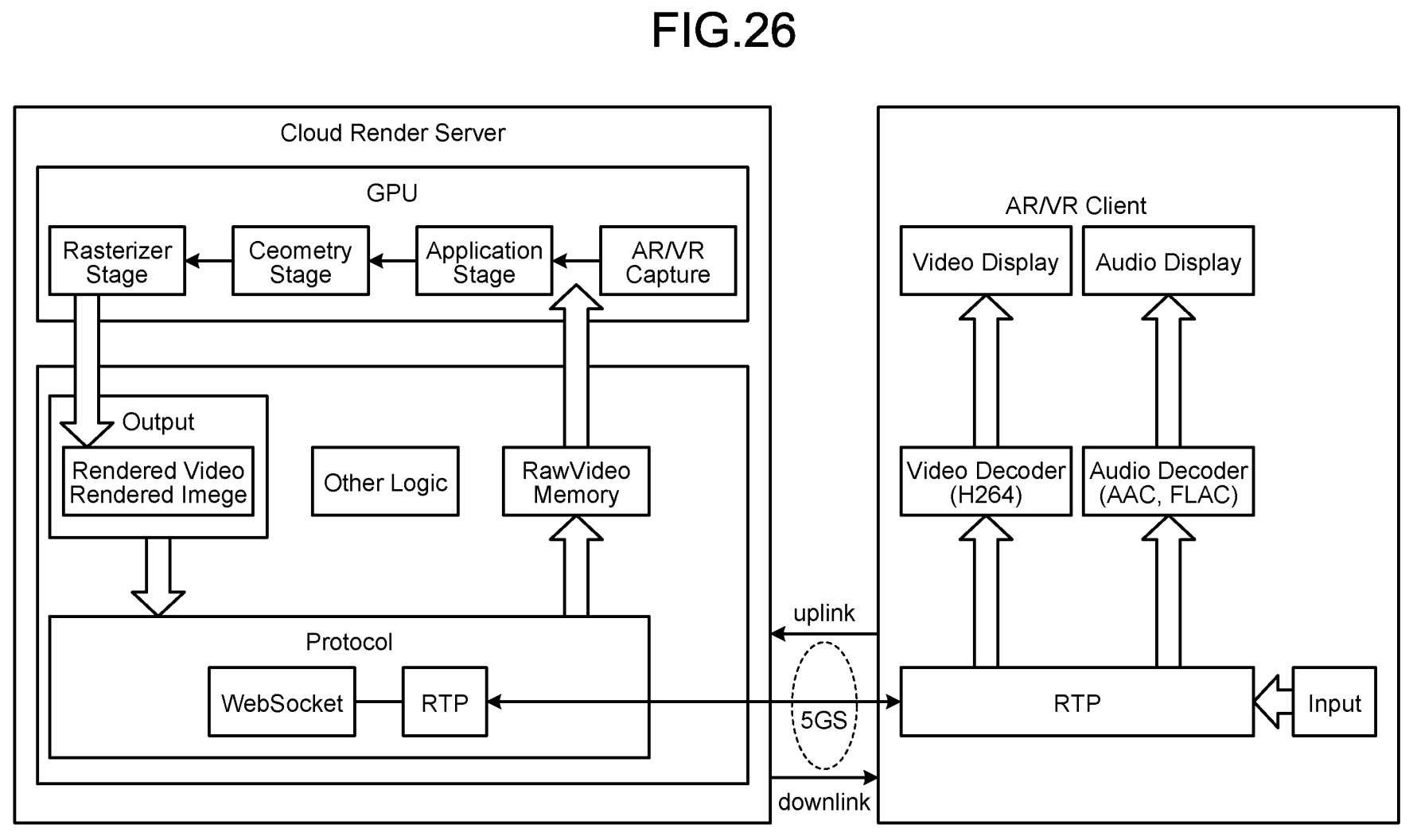

FIG. 26 is a concept diagram of a rendering server regarding rendering and an AR/VR client. FIG. 26 is described in the technical report described above. Incidentally, the AR/VR client may correspond to the terminal device 110 in the present disclosure. Furthermore, the Cloud Render Server may correspond to the information processing device 150 in the present disclosure. Alternatively, the Cloud Render Server may be an application server (for example, edge computing server) for edge computing in a local area data network (LADN) with which the local UPF connected to the base station device 130 in the present disclosure functions as an interface. In addition, the Cloud Render Server may be referred to as Edge Render Server or Split Render Server.

In this application example, for example, in a case of data communication (for example, a session (PDU session), a bearer (Radio Bearer), and a packet flow (QoS flow)) in which a motion-to-photon delay (7 to 15 ms) or a motion-to-sound delay (less than 20 ms) is required, the SPS or CG reconfiguration described above may be performed.

In another aspect, in a case of data communication (for example, a session (PDU session), a bearer (Radio Bearer), or a packet flow (QoS flow)) in which a requirement regarding the rendering, max allowed end-to-end latency (5 ms) is required, the SPS or CG reconfiguration described above may be performed.

7. CONCLUSION

Although the preferred embodiments of the disclosure have been described in detail by referring to the accompanying drawings, the technical scope of the disclosure is not limited to such examples. It is obvious that a person having ordinary knowledge in the technical field of the disclosure can conceive various modifications or variations within the scope of the technical idea described in the claims, and it is naturally understood that these also belong to the technical scope of the disclosure.

Among the processing described in the above embodiments, all or a part of the processing described as that performed automatically can be performed manually, or all or a part of the processing described as that performed manually can be performed automatically by a known method. In addition, a processing procedure, a specific name, and information including various types of data or parameters illustrated in the above or in the drawings can be modified as desired unless otherwise specified. For example, various types of information illustrated in the drawings are not limited to the information that has been illustrated.

In addition, each component of each device illustrated in the drawings is conceptual in terms of function and does not need to be necessarily physically configured as illustrated in the drawings. That is, the specific form of distribution and integration of devices is not limited to those illustrated in the drawings, and all or a part thereof can be functionally or physically distributed or integrated in any unit depending on various loads, use status, and the like.

In addition, the above embodiments can be combined as appropriate as long as there is no contradiction in the processing content.

Furthermore, the effects described herein are merely illustrative or exemplary and are not limiting. That is, the technology according to the present disclosure can achieve other effects that are obvious to those skilled in the art from the description of the present specification together with or in place of the above effects.

Note that the following configurations also belong to the technical scope of the present disclosure.

(1)
A base station device comprising:
a radio communication unit that transmits video data to a terminal device in a predetermined period; and
a control unit that changes setting regarding reception timing in a case where a difference between periodic reception timing at which the terminal device receives the video data and display timing of the video data displayed on the terminal device at a predetermined frame rate satisfies a predetermined condition.

(2)
The base station device according to (1), wherein the setting regarding the reception timing is semi-persistent scheduling (SPS) setting.

(3)
The base station device according to (1) or (2), wherein the control unit changes the setting regarding the reception timing by resetting the reception timing so that the reception timing and the display timing are matched.

(4)
The base station device according to any one of (1) to (3), wherein the control unit changes the setting regarding the reception timing by notifying the terminal device of an offset indicating the reception timing that has been changed.

(5)
The base station device according to any one of (1) to (4), wherein, in a case where the setting regarding a plurality of pieces of the reception timing is set in the terminal device, the control unit changes the setting regarding the reception timing by notifying the terminal device of the setting to be deactivated and the setting to be newly activated among setting related to the plurality of pieces of the reception timing.

(6)
The base station device according to any one of (1) to (5), wherein the predetermined condition has the difference greater than or equal to a threshold value or has an accumulation of the differences greater than or equal to a threshold value.

(7)
The base station device according to any one of (1) to (6), wherein the control unit changes the setting regarding the reception timing in response to a request from the terminal device.

(8)
The base station device according to any one of (1) to (7), wherein the control unit changes the setting regarding the reception timing in accordance with an instruction from a network function belonging to a network to be connected to.

(9)
The base station device according to any one of (1) to (8), wherein the control unit acquires information regarding the frame rate from a content server that acquires the video data.

(10)
The base station device according to any one of (1) to (9), wherein, in a case where the video data is displayed at a second frame rate larger than the frame rate by generating an image from the video data on a basis of information regarding a viewpoint of a user, the terminal device adjusts a number of the images to be generated depending on the difference.

(11)
The base station device according to any one of (1) to (10), wherein
the control unit transmits each of areas obtained by dividing the video data into a plurality of pieces with the setting of the reception timing corresponding to a priority of the area, and
the priority of the area is set on a basis of information regarding a viewpoint of a user.

(12)
The base station device according to (11), wherein
the priority of the area is set depending on a resolution of the area set on a basis of the information regarding the viewpoint of the user.

(13)
A terminal device comprising:
a radio communication unit that receives video data from a base station device in a predetermined period; and
a control unit that displays the video data at a predetermined frame rate, wherein
the radio communication unit receives the video data on a basis of setting of the reception timing that has been changed in a case where a difference between periodic reception timing of receiving the video data and display timing of displaying the video data at the predetermined frame rate satisfies a predetermined condition.

(14)
A communication method comprising:
transmitting video data to a terminal device in a predetermined period; and
changing setting regarding reception timing in a case where a difference between the periodic reception timing at which the terminal device receives the video data and display timing of the video data displayed on the terminal device at a predetermined frame rate satisfies a predetermined condition.

43

(15)

A communication method comprising:

receiving video data from a base station device in a predetermined period;

displaying the video data at a predetermined frame rate; and in a case where a difference between periodic reception timing of receiving the video data and display timing of displaying the video data at the predetermined frame rate satisfies a predetermined condition, receiving the video data on a basis of setting of the reception timing that has been changed when the video data is received.

(16)

A base station device comprising:

a radio communication unit that receives user information from a terminal device in a first period and transmits video data generated on a basis of the user information in a second period; and a control unit that changes setting regarding transmission timing at which the terminal device periodically transmits the user information in a case where a difference between periodic reception timing at which the terminal device receives the video data and display timing of the video data to be displayed on the terminal device at a predetermined frame rate satisfies a predetermined condition.

(17)

The base station device according to (1), in which the control unit further sets an intermittent reception period and an ON period of time on a basis of the setting regarding reception timing.

(18)

The base station device according to (17), in which the control unit configures one piece of intermittent reception as configuration of the intermittent reception and allocates a downlink control channel to the ON period of time in the configuration of the one piece of intermittent reception.

(19)

The base station device according to (17), in which the control unit configures, as the configuration of the intermittent reception, second intermittent reception different from a configuration of first intermittent reception setting for monitoring the downlink control channel, and a period of the second intermittent reception and the ON period of time are set on a basis of the setting regarding the reception timing.

(20)

The base station device according to (19), in which the control unit sets, as a configuration of the second intermittent reception, a threshold value regarding an interval between a first ON period of time of the first intermittent reception and a second ON period of time of the second intermittent reception.

(21)

The terminal device according to (13), in which the radio communication unit sets an intermittent reception period and an ON period of time based on the setting of the reception timing.

(22)

The terminal device according to (21), in which the radio communication unit configures, as a configuration of the intermittent reception, second intermittent reception different from a configuration of first intermittent reception setting for monitoring a downlink control channel, and

a period of the second intermittent reception and the ON period of time are set on a basis of the setting regarding the reception timing.

(23)

The terminal device according to (22), in which, in a case where a first ON period of time of the first intermittent reception and a second ON period of time of the second intermittent reception partially or entirely overlap, the radio communication unit sets a third ON period of time including the first ON period of time and the second ON period of time.

(24)

The terminal device according to (22), in which the radio communication unit sets a threshold value regarding an interval between the first ON period of time of the first intermittent reception and the second ON period of time of the second intermittent reception as a configuration of the second intermittent reception, and sets the third ON period of time including the first ON period of time and the second ON period of time in a case where an interval between the first ON period of time of the first intermittent reception and the second ON period of time of the second intermittent reception is less than or equal to the threshold value or less than the threshold value.

REFERENCE SIGNS LIST

100 CONTENT DISTRIBUTION SYSTEM
110 TERMINAL DEVICE
130 BASE STATION DEVICE
131 COMMUNICATION UNIT
134 CONTROL UNIT
150 INFORMATION PROCESSING DEVICE

The invention claimed is:

1. A communication device, comprising:

circuitry configured to:

acquire extended reality (XR) traffic period information from a core network, wherein the XR traffic period information is indicated by information related to a traffic, and the XR traffic period information is included in a Policy and Charging Control (PCC) Rule;

transmit a Protocol Data Unit (PDU) session establish request for an XR service, wherein the PCC Rule is provided in association with a Session Management (SM) Policy Association during a PDU session establishment procedure that corresponds to the PDU session establishment request, and the XR traffic period information is used to configure a discontinuous reception (DRX); and set a plurality of transmission occasions within a single period of a Configured Grant (CG) configuration.

2. The communication device according to claim 1, wherein the plurality of transmission occasions that is within the single period of the CG configuration is related to the XR traffic period information.

3. A communication method, comprising:

acquiring extended reality (XR) traffic period information from a core network, wherein the XR traffic period information is indicated by information related to a traffic, the XR traffic period information is included in a Policy and Charging Control (PCC) Rule;

transmitting a Protocol Data Unit (PDU) session establishment request for an XR service, wherein the PCC Rule is provided in association with a Session Management (SM) Policy Association during a PDU session establishment procedure that corresponds to the PDU session establishment request, and the XR traffic period information is used to configure a discontinuous reception (DRX); and setting a plurality of transmission occasions within a single period of a Configured Grant (CG) configuration.

4. The communication method according to claim 3, wherein the plurality of transmission occasions that is within the single period of the CG configuration is related to the XR traffic period information.

5. The communication device according to claim 1, wherein the circuitry is further configured to receive specific information from an application function, and the specific information is associated with the CG configuration.

6. The communication method according to claim 3, further comprising receiving specific information from an application function, wherein the specific information is associated with the CG configuration.

* * * * *